United States Patent
Hamada

(10) Patent No.: US 6,934,527 B1
(45) Date of Patent: Aug. 23, 2005

(54) WIRELESS COMMUNICATION SYSTEM CAPABLE OF CHANGING DYNAMICALLY CHARGE RATE AND WIRELESS COMMUNICATION UNIT USABLE THEREWITH

(75) Inventor: Masashi Hamada, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 238 days.

(21) Appl. No.: 09/676,685

(22) Filed: Sep. 29, 2000

(30) Foreign Application Priority Data

Oct. 1, 1999 (JP) .......................................... 11-281515
Sep. 28, 2000 (JP) ....................................... 2000-297462

(51) Int. Cl.[7] ............................................ H04M 15/00
(52) U.S. Cl. ..................................... 455/405; 455/406
(58) Field of Search ............................... 455/405–408, 455/453, 452.1, 435.2, 445; 379/111, 112.1, 114.02, 114.08

(56) References Cited

U.S. PATENT DOCUMENTS

| | | | | |
|---|---|---|---|---|
| 5,303,297 A | * | 4/1994 | Hillis | .......................... 455/406 |
| 5,970,403 A | * | 10/1999 | Alperovich et al. | ......... 455/406 |
| 5,974,308 A | | 10/1999 | Vedel | |
| 6,009,154 A | * | 12/1999 | Rieken et al. | .......... 379/114.12 |
| 6,018,652 A | * | 1/2000 | Frager et al. | ................ 455/406 |
| 6,134,442 A | * | 10/2000 | Borst et al. | .................. 455/445 |
| 6,311,054 B1 | * | 10/2001 | Korpela | ....................... 455/406 |
| 6,345,181 B1 | * | 2/2002 | Janhonen et al. | ............ 455/406 |

FOREIGN PATENT DOCUMENTS

| | | | |
|---|---|---|---|
| EP | 0 597 638 A1 | 11/1992 | |
| EP | 0 597 638 A2 | * 5/1994 | ............ H04Q/7/04 |
| EP | 0 920 177 A2 | * 2/1999 | .......... H04M/15/00 |
| JP | 5-183495 | 7/1993 | |

* cited by examiner

Primary Examiner—William Trost
Assistant Examiner—Brandon J. Miller
(74) Attorney, Agent, or Firm—Milbank, Tweed, Hadley & McCloy LLP

(57) ABSTRACT

The invention aims at providing a method of notifying a charge rate from a wireless controller to a wireless communication unit when the charge rate is changed dynamically.

According to the invention, there is provided a wireless communication system having a wireless controller for controlling a wireless communication unit. The wireless communication system is composed of determination means for determining a situation within a wireless cell controlled by the wireless controller, memory means for storing a threshold for changing the charge rate for communication within the wireless cell, the threshold having a hysteresis characteristic, and decision means for deciding the charge rate for communication within the wireless cell based on the situation determined by the determination means and the threshold having the hysteresis characteristic stored in the memory means.

5 Claims, 22 Drawing Sheets

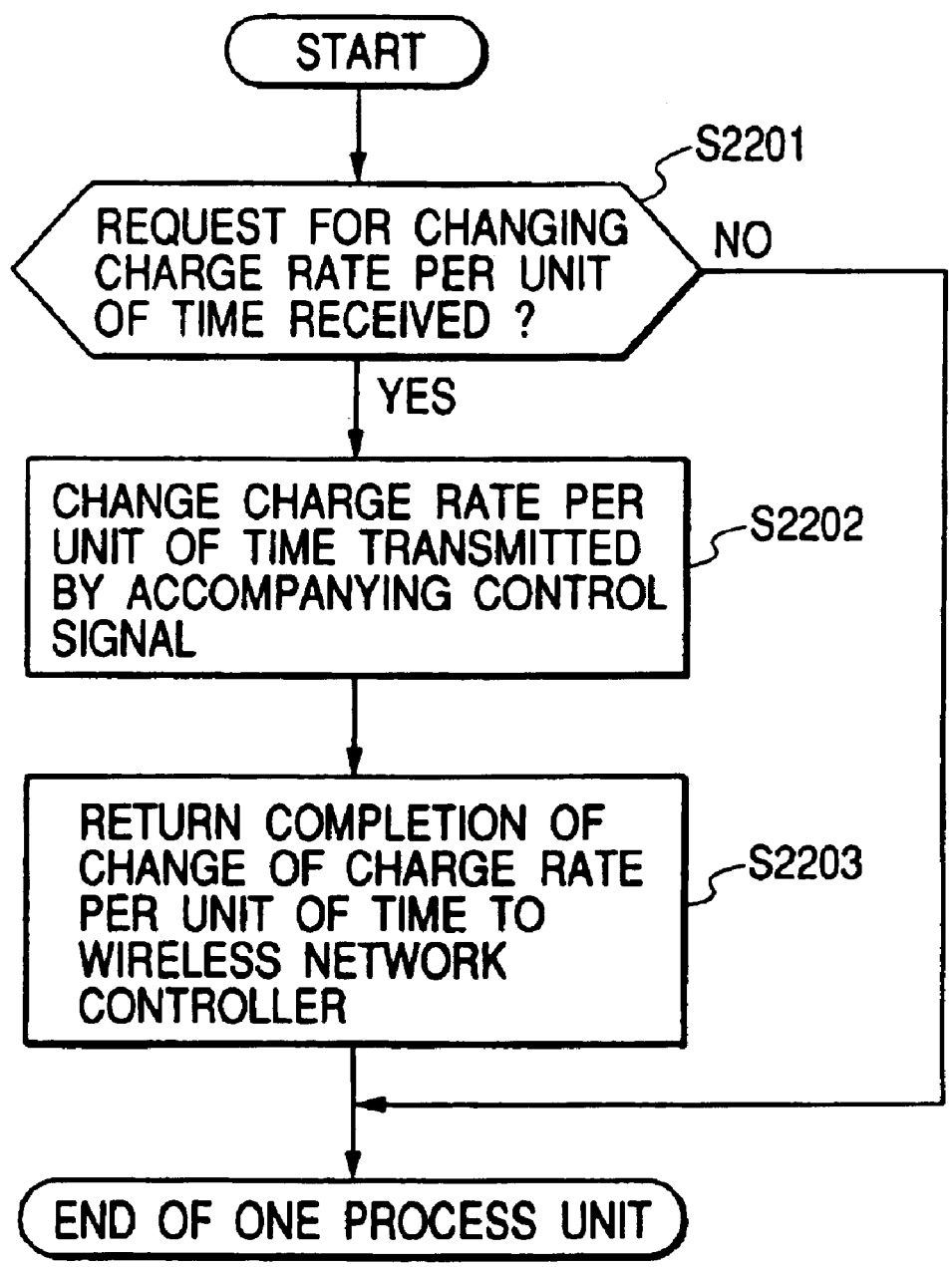

WIRELESS COMMUNICATION SYSTEM CAPABLE OF CHANGING DYNAMICALLY CHARGE RATE AND WIRELESS COMMUNICATION UNIT USABLE THEREWITH

BACKGROUND OF THE INVENTION

1. Field of the Invention

The present invention relates to a wireless communication system and a wireless communication terminal, and more particularly to a wireless communication system capable of changing dynamically a charge rate and a wireless communication unit which can be used in the wireless communication system.

2. Related Background Art

Conventional cellular wireless communication systems for public use, relying on a micro cell or the like, including PDC (Personal Digital Cellular), PHS (Personal Handyphone System), and GSM (Global System for Mobile communications), make use of, as a parameter for changing the communication fee (charge rate), static information such as a charge condition (service plan) agree upon when the user of a wireless communication terminal subscribes the service provided by a carrier, or communication time.

Accordingly, such wireless communication systems do not use dynamic information (a communication traffic volume or a remaining wireless resource amount) as a parameter for changing a charge rate, so that it is not possible to charge minutely depending on a situation for each wireless cell at the place or time where communication occurs.

In Japanese Patent Application Laid-Open No. 5-183495, it is disclosed that in order to make effective use of wireless resources within a wireless communication system, a new call is limited by setting the service charge for a newly arising call to be higher than the ordinary fee, if the traffic volume of service channel in a wireless base station has exceeded a predetermined value. Also, in Japanese Patent Application Laid-Open No. 5-183495, it is disclosed that the fee information notified from a wireless base station is output by voice or images at a mobile station such as a portable telephone, so that the user can determine whether to make a call or not.

Further, in European Patent EP0597638A1, it is disclosed that the charge rate is changed in accordance with the volume of service channel in a wireless bass station, and the user can make a call after confirming the charge rate for use.

However, in Japanese Patent Application Laid-Open No. 5-183495 and EP 0597638A1, there is no consideration about how to notify the fee information from a wireless base station to a mobile station.

Also, in U.S. Pat. No. 5,303,297 (Japanese Patent Application Laid-Open No. 5-199331), it is disclosed that on a call request, a charge rate is determined by calculating the utilization factor for all the available resources in both wired section and wireless section which are usable for a communication between a calling terminal and a called terminal, and is notified to the calling terminal.

However, with a method of determining the charge rate in accordance with the amount of service resources including the wired section, as in U.S. Pat. No. 5,303,297 (Japanese Patent Application Laid-Open No. 5-199331), there is the problem that the calculation of charge rate is complicated, and it takes longer time to calculate the charge rate. To calculate the charge rate, the service situation for all the paths from the calling terminal to the called terminal must be examined, and traffic is further increased to communicate the information as to the service situation. Also, load on the system would be increased.

In the conventional examples as described above, when the charge rate is changed dynamically in accordance with the amount of service resources for the wireless base station or the whole system, no consideration is taken as to how to notify the charge rate.

Also, in the conventional examples, no consideration is taken as to how to change the charge rate to be optimal for the user.

Further, usability of the terminal in the system in which the charge rate is dynamically changed is not considered.

SUMMARY OF THE INVENTION

It is an object of the present invention to provide a method of notifying a charge rate from a wireless control station to a wireless communication unit, when the charge rate is changed dynamically.

It is another object of the invention to provide an optimal method of changing the charge rate.

It is a further object of the invention to provide improvements in usability of a wireless communication terminal for use with a communication system in which charge rate can be changed dynamically.

Other objects of the invention will be apparent from the following description and drawings.

BRIEF DESCRIPTION OF THE DRAWINGS

FIG. 22 is a flowchart showing a process for a wireless base station according to the seventh embodiment of the invention.

DESCRIPTION OF THE PREFERRED EMBODIMENTS

The preferred embodiments of the present invention will be described below with reference to the drawings.

First Embodiment

Figure 1:
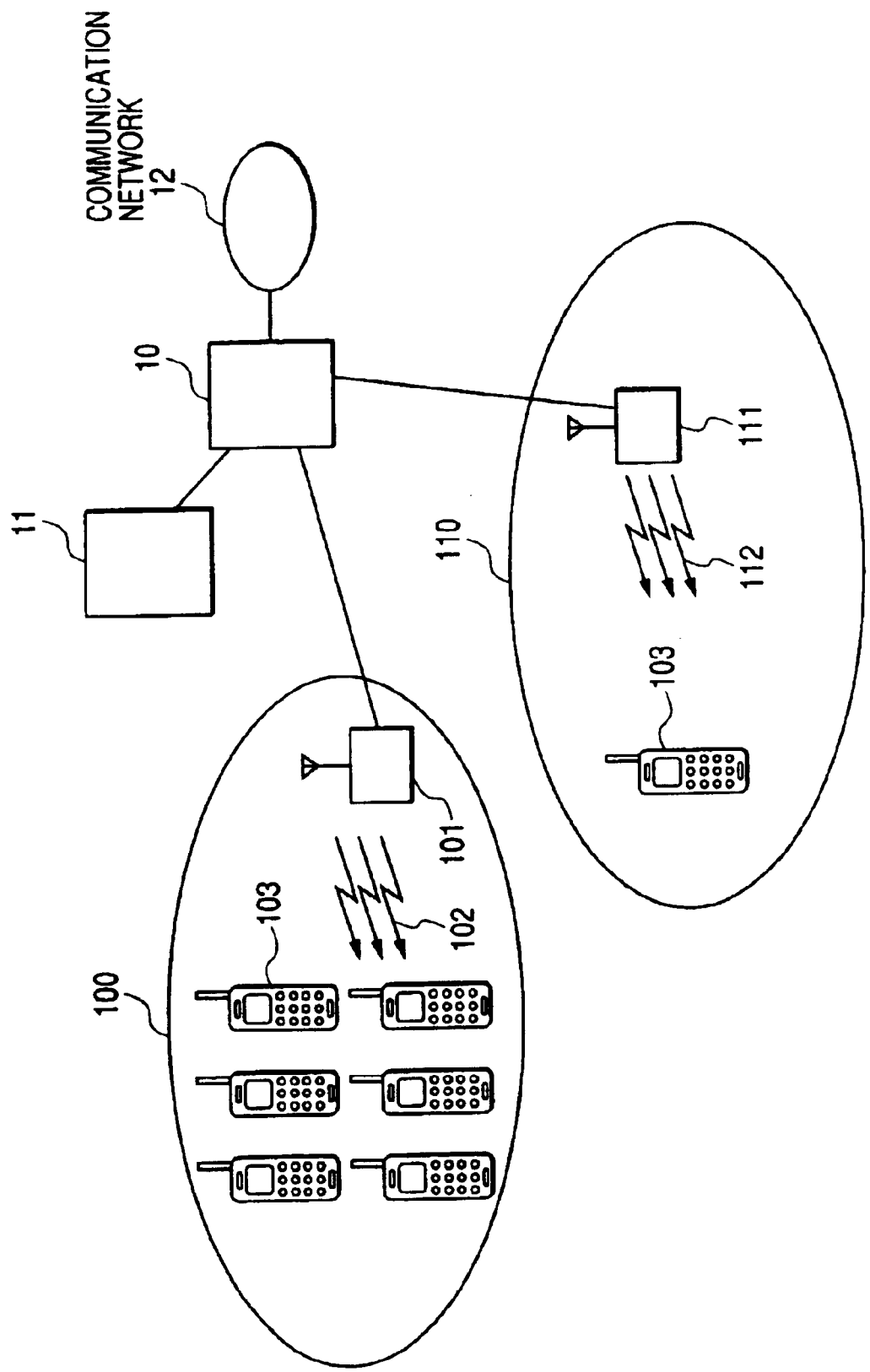
FIG. 1 is a system configuration view showing the whole of a wireless communication system according to first to fourth embodiments of the present invention.
Figure 2:
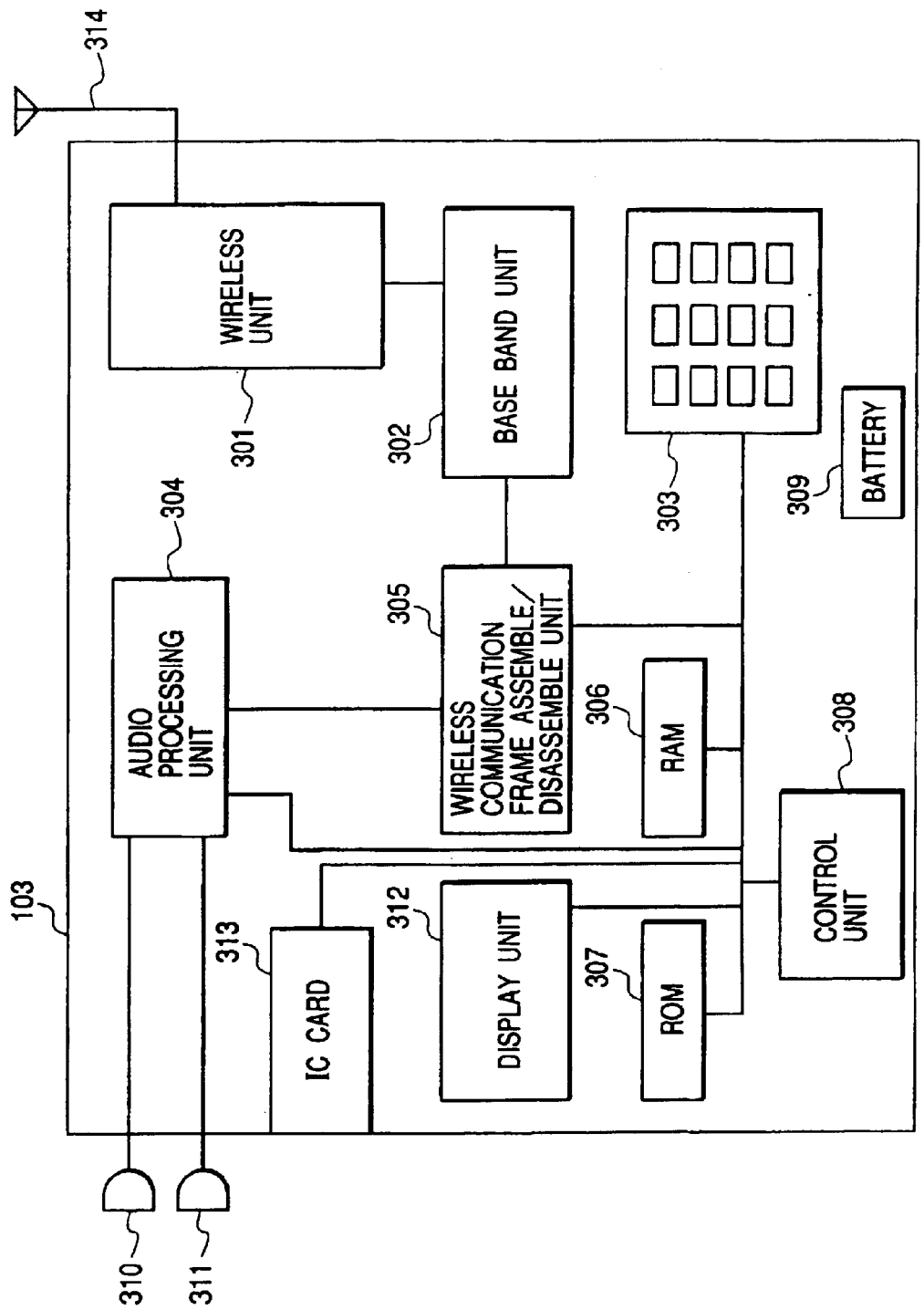
FIG. 2 is a block diagram showing an internal configuration of a wireless communication terminal used for explaining the embodiments of the invention.
Figure 3:
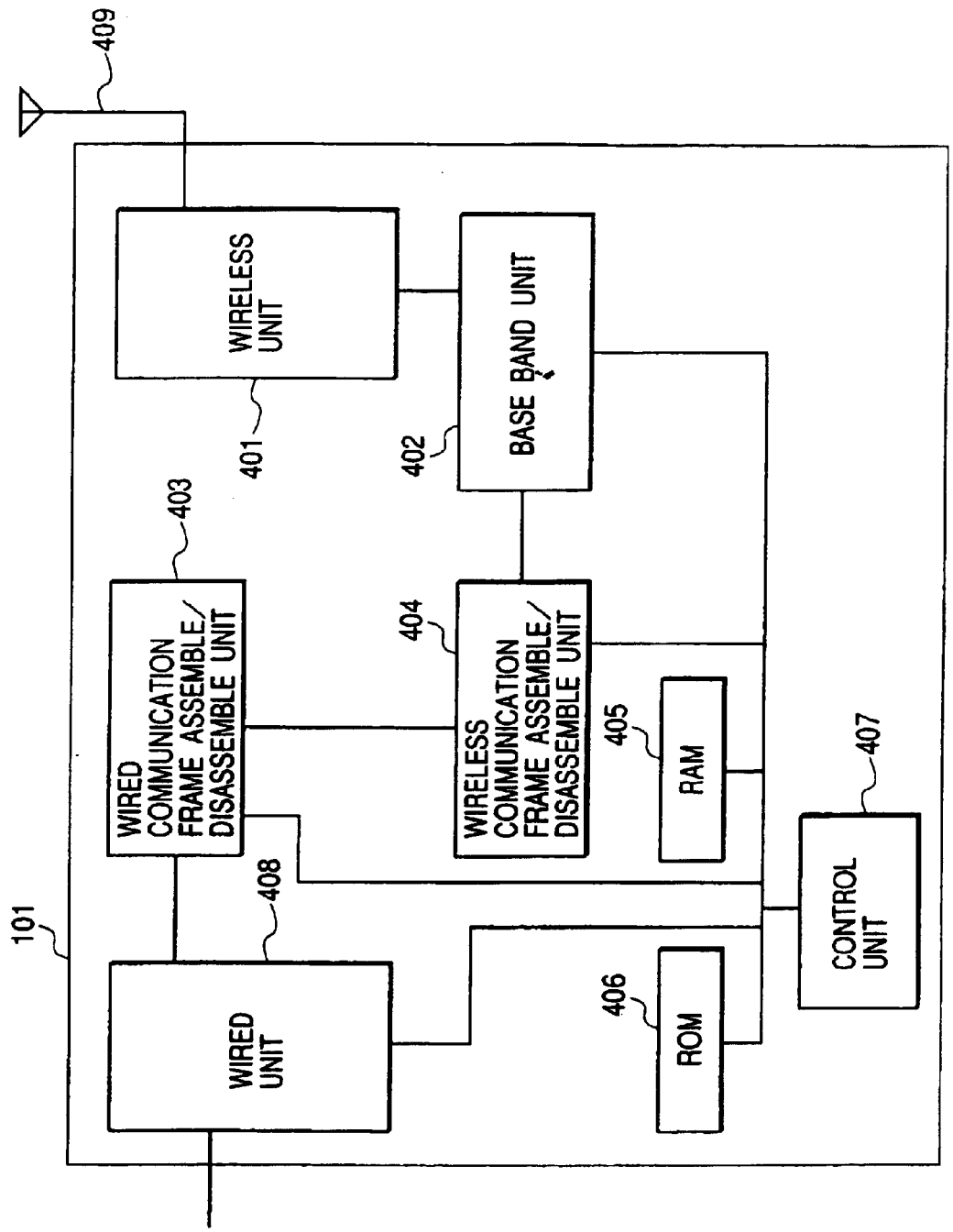
FIG. 3 is a block diagram showing an internal configuration of a wireless base station used for explaining the embodiments of the invention.

Referring to FIGS. 1 to 3, a wireless communication system according to a first embodiment of the present invention will be described below. This wireless communication system is presumed to be roaming, and uses a mobile communication system of a wideband CDMA (W-CDMA) (Wideband code division multiple access) which is a candidate for the IMT2000 (International Mobile Telecommunication 2000) system. FIG. 1 is a system configuration view showing the whole of the wireless communication system according to the first embodiment of the invention.

In FIG. 1, a wireless cell 100 which is controlled by a wireless base station 101 is a cell having a high communication traffic volume (i.e., a high traffic wireless cell) for accommodating a great number of wireless communication terminals 103. In the wireless cell 100, each of the wireless communication terminals 103 is connected to the wireless base station 101 via a wireless communication line. A wireless cell 110 which is controlled by a wireless base station 111 is a cell having a low communication traffic volume (i.e., a low traffic wireless cell) for accommodating a small number of wireless communication terminals 103. In the wireless cell 110, each of the wireless communication terminals 103 is connected to the wireless base station 111 via a wireless communication line.

The wireless base stations 101, 111 are connected to an external communication network 12 via a switching facility 10 which is managed by the carrier. The switching facility 10 is connected to a charge control center 11 for managing the charge of a wireless communication terminal 103. Each of the informing signals 102, 112 which the wireless base stations 101, 111 send out is a signal for notifying a situation of the wireless communication system to the wireless communication terminal 103 which is waiting within each of the wireless cells 100, 110 which is controlled by each of the wireless base stations 101, 111, and periodically transmitted. Of course, the number of wireless base stations 101, 111 and the number of wireless communication terminal 103 are not limited to those as shown in the figure.

FIG. 2 is a block diagram showing an internal configuration of the wireless communication terminal 103 of FIG. 1. In FIG. 2, the wireless communication terminal 103 is configured by a wireless unit 301 for effecting transmission and reception of a radio wave coupled with an antenna 314, a base band unit 302 for modulating and demodulating a signal, which is connected to the wireless unit 301, an operation unit 303 for inputting the dial information and so on, an audio processing unit 304 for making conversion between a digital signal and an audio signal, which is connected to a telephone transmitter 310 and a telephone receiver 311, a wireless communication frame assemble/disassemble unit 305 for assembling the digital information into a data frame corresponding to the wireless communication system, and disassembling the data frame, the wireless communication frame assemble/disassemble unit 305 being connected to the audio processing unit 304, a RAM 306 for storing temporarily various kinds of information, a ROM 307 for storing a control program and so on, a control unit 308 for controlling each unit in accordance with the control program, which is connected to each unit, a battery 309 for supplying an electric power to each unit, which is a typical secondary cell, a display unit 312 for displaying various kinds of information, and an IC card 313 for storing the user information such as subscriber information and an electronic directory.

FIG. 3 is a block diagram showing an internal configuration of a wireless base station 101 of FIG. 1. In FIG. 3, the wireless base station 101 is configured by a wireless unit 401 for effecting transmission and reception of a radio wave coupled with an antenna 409, a base band unit 402 for modulating and demodulating a signal, which is connected to the wireless unit 401, a wired communication frame assemble/disassemble unit 403 for assembling the digital information into a data frame corresponding to a wired communication system, and disassembling the data frame, a wireless communication frame assemble/disassemble unit 404 for assembling the digital information into a data frame corresponding to a wireless communication system, and disassembling the data frame, the wireless communication frame assemble/disassemble unit 404 being connected to the base band unit 402 and the wired communication frame assemble/disassemble unit 403, a RAM 405 for storing temporarily various kinds of information, a ROM 406 for storing a control program and so on, a control unit 407 for controlling each unit in accordance with the control program, and a wired unit 408 which is an interface portion with a wired channel, the wired unit being connected to the wired communication frame assemble/disassemble unit 403 and an external wired channel. A wireless base station 111 has the same configuration as above, and explanation will be given below only of the wireless base station 101.

Figure 4:
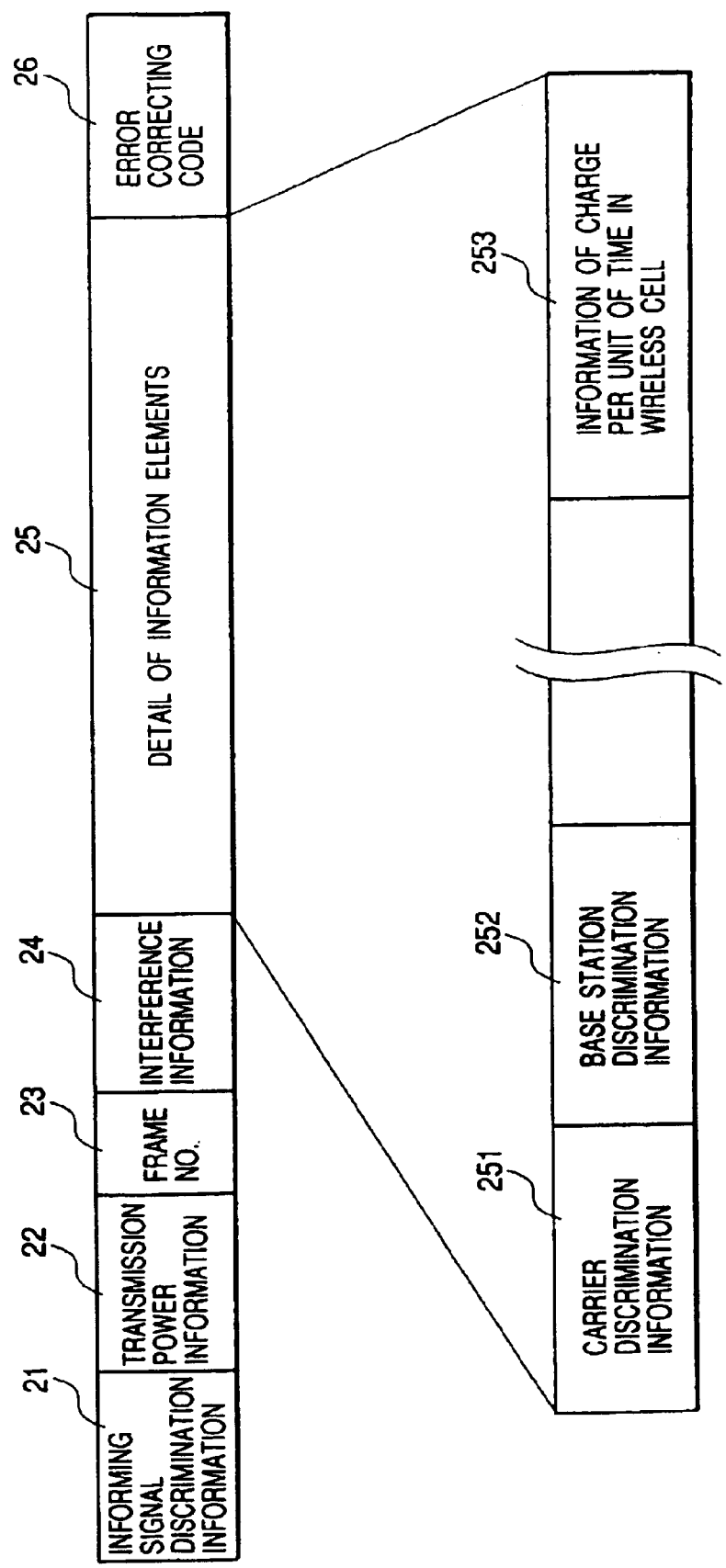
FIG. 4 is a schematic diagram showing a format of an informing signal that is sent out from a wireless base station of a wireless communication system used for explaining the embodiments of the invention.

FIG. 4 is a schematic view showing a format of an informing signal 102 which is sent out from the wireless base station 101 of the wireless communication system according to the first embodiment of the invention. In FIG. 4, an informing signal identification information field 21 indicates that the signal is an informing signal, and a transmission power information field 22 indicates the transmission power of the informing signal 102. A frame number 23 is to enable recognition of the continuity of data to a wireless communication terminal 103, and an interference information field 24 indicates an information format of an informing signal 102 transmitted from the wireless base station 101 to the wireless communication terminal 103. A detail of information elements field 25 is used to notify the system control information, and is constituted of a carrier identification information field 251, a wireless base station identification information field 252, and so on. An error correcting code 26 is to detect and correct an error which occurs during transmission of the signal.

In this embodiment, as a new constituent element in the detail of information elements field 25 within the informing signal 102, there is provided in an information field 253 of charge rate per unit of time in wireless cell which is an area for storing the charge rate information per unit of time in the wireless cell 100. Consequently, the charge rate information per unit of time can be notified in real time to the wireless communication terminal 103 which is waiting in the wireless cell 100.

Figure 5:
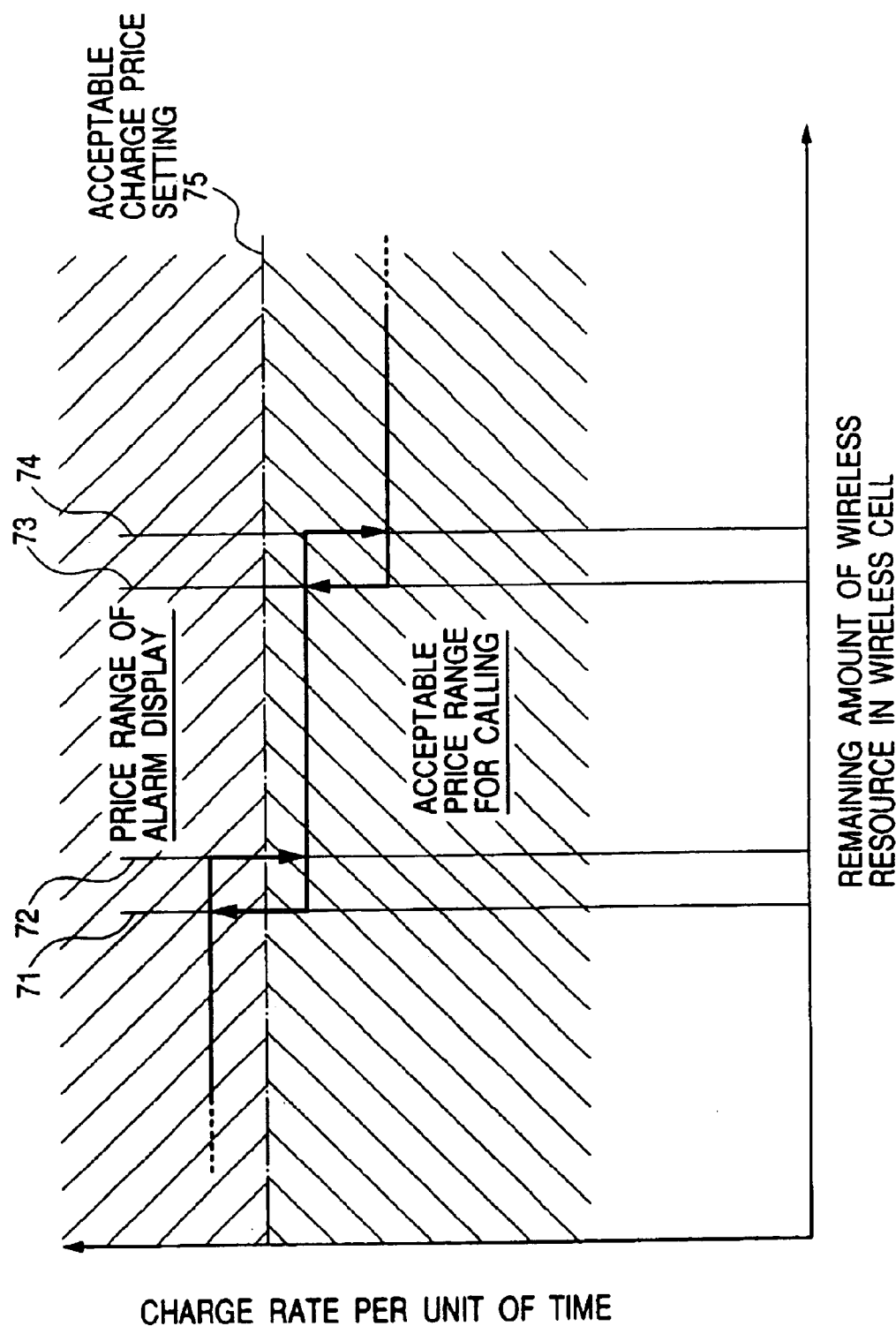
FIG. 5 is a view showing the relation between a charge rate per unit of time within a wireless cell and a remaining amount of wireless resources within the wireless cell which is controlled by a wireless base station of a wireless communication system used for explaining the first to fourth embodiments of the invention.
Figure 6:
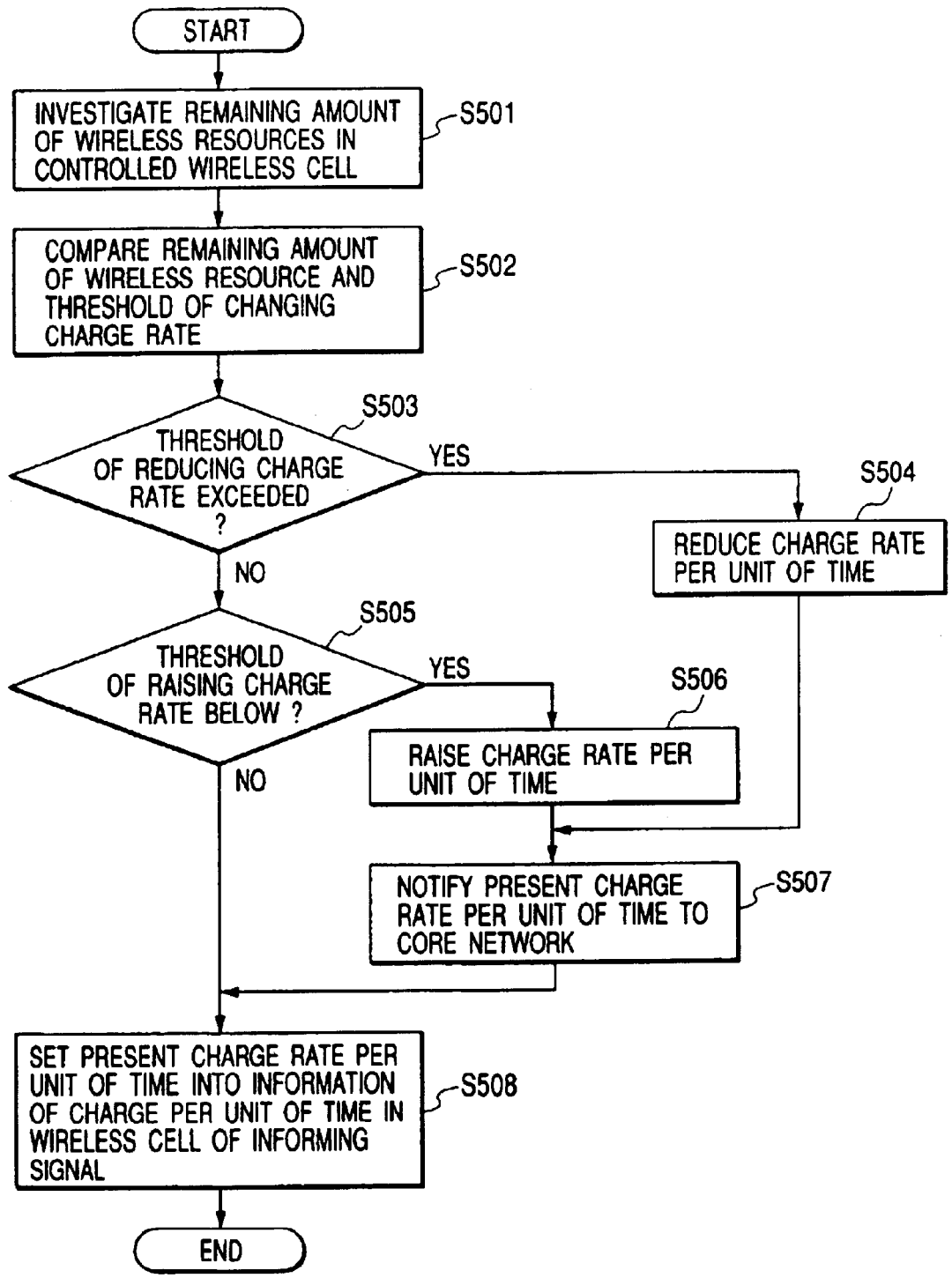
FIG. 6 is a flowchart showing a process in which the wireless base station of the wireless communication system changes the present charge rate per unit of time and sets it in an informing signal according to a first embodiment of the invention.

Referring now to FIGS. 5 and 6, explanation will be given below of a processing in which the wireless base station 101 changes the charge rate per unit of time depending on the remaining amount of wireless resources in the wireless cell 100 controlled by the wireless base station 101, and notifies the charge rate to the wireless communication terminal 103 which is waiting. FIG. 5 is a view showing the relation between the charge rate per unit of time in the wireless cell 100 and the remaining amount of wireless resources in the wireless cell 100, which is controlled by the wireless base station 101 of the wireless communication system according to the first embodiment of the invention. In FIG. 5, the charge rate per unit of time is indicated along the axis of ordinate, and the remaining amount of wireless resources in the wireless cell (amount of individual physical channels available) along the axis of abscissa. In this embodiment, the remaining amount of wireless resources indicating a predetermined situation in the wireless cell 100 will be described later as the parameter for changing the charge rate per unit of time, but the communication traffic volume in the wireless cell 100 may be also applied.

In FIG. 5, the charge rate down thresholds 72, 74 are charge rate change thresholds for lowering the charge rate per unit of time, when the number of wireless communication terminals 103 decreases (or the remaining amount of wireless resources in the wireless cell increases) which are connected wireless in the wireless cell 100 controlled by the wireless base station 101. The charge rate up thresholds 71, 73 are charge rate change thresholds for raising the charge rate per unit of time, when the number of wireless communication terminals 103 increases (or the remaining amount of wireless resources in the wireless cell decreases) which are connected wireless in the wireless cell 100 controlled by the wireless base station 101. An acceptable charge price setting 75 is an acceptable charge rate that can be preset by the user. The acceptable charge price setting 75 is stored in the RAM 306 for the wireless communication terminal 103. A price range of alarm display indicates a range of charge rate going beyond the acceptable charge price setting 75, and an acceptable price range for calling indicates a range of charge rate falling below the acceptable charge price setting 75.

FIG. 6 is a flowchart showing a processing in which the control unit 407 in the wireless base station 101 of the wireless communication system controls each unit to change the present charge rate per unit of time and set it in an informing signal 102 according to the first embodiment of the invention. In FIG. 6, the control unit 407 of the wireless base station 101 investigates the remaining amount of wireless resources in the controlled wireless cell 100 (step S501). Then, a comparison is made between the charge rate corresponding to the remaining amount of wireless resources in the wireless cell 100 which is investigated by the control unit 407 and the thresholds of changing charge rate (charge rate up thresholds 71, 73 and charge rate down thresholds 72, 74) which are stored in the RAM 405 (step S502). A determination is made whether or not the charge rate corresponding to the remaining amount of wireless resources in the wireless cell exceeds the thresholds 72, 74 of reducing the charge rate (step S503). As a result of this determination, if the charge rate corresponding to the remaining amount of wireless resources in the wireless cell does not exceed the thresholds 72, 74 of reducing the charge rate, the operation proceeds to step S505.

In step S505, a determination is made whether or not the charge rate corresponding to the remaining amount of wireless resources in the wireless cell 100 is below the thresholds 71, 73 of raising the charge rate. As a result of determination, if it is not below the thresholds 71, 73 of raising the charge rate, the present charge rate per unit of time is set to the charge rate information 253 per unit of time in the wireless cell of the informing signal 102 (step S508). Then, this process ends. As a result, the charge rate is not changed, and the same charge rate is continuously used.

On the other hand, as a result of determination in step S503, if the charge rate corresponding to the remaining amount of wireless resources in the wireless cell is above the thresholds 72, 74 of reducing the charge rate, the charge rate per unit of time is reduced (step S504). The present charge rate per unit of time is notified to a core network including the switching facility 10 and the charge control center 11 which are interconnected (step S507). Then a process in step S508 is performed. Thereafter, this process ends.

As a result of determination in step S505, if the charge rate corresponding to the remaining amount of wireless resources in the wireless cell is below the thresholds 71, 73 of raising the charge rate, the charge rate per unit of time is raised (step S506). Then the process in steps S507 and S508 is performed. Thereafter, this process ends.

According to the first embodiment of the invention, the wireless base stations 101, 111 change the present charge rate per unit of time in accordance with the remaining amount of wireless resources in the wireless cells 100, 110 which is a dynamic information parameter (steps S501 to S506), set the thus-changed charge rate information in the charge rate per unit of time information in wireless cell 253 which is provided as a new constituent element within the informing signals 102, 112 which the wireless base stations 101, 111 transmit regularly (step S508). Thereby, the changed charge rate is notified to the wireless communication terminal 103 which is waiting in the wireless cells 100, 110, without connecting a wireless line. Accordingly, the wireless resources in the wireless cells 100, 110 can be effectively utilized, and the user of the wireless communication terminal 103 can grasp the communication fee (charge rate) before making line connection, to effect communication within the limit of budgetary appropriation of the user.

Also, the thresholds for raising the charge rate and the thresholds for reducing the charge rate are set at different values, namely, the thresholds 71, 72 or the thresholds 73, 74 are set at different values which are separated by a predetermined interval, and the charge rate is changed based on the threshold having a hysteresis characteristic. Thereby, even in the case where the remaining amount of wireless resources in the wireless cell or the communication traffic volume in the wireless cell is varied near the threshold, it is possible to suppress the charge rate from being changed too frequently.

Since the charge rate is set in the informing signal at all times, a new wireless communication terminal which has moved into the wireless cell can readily recognize the charge rate.

Second Embodiment

Figure 7:
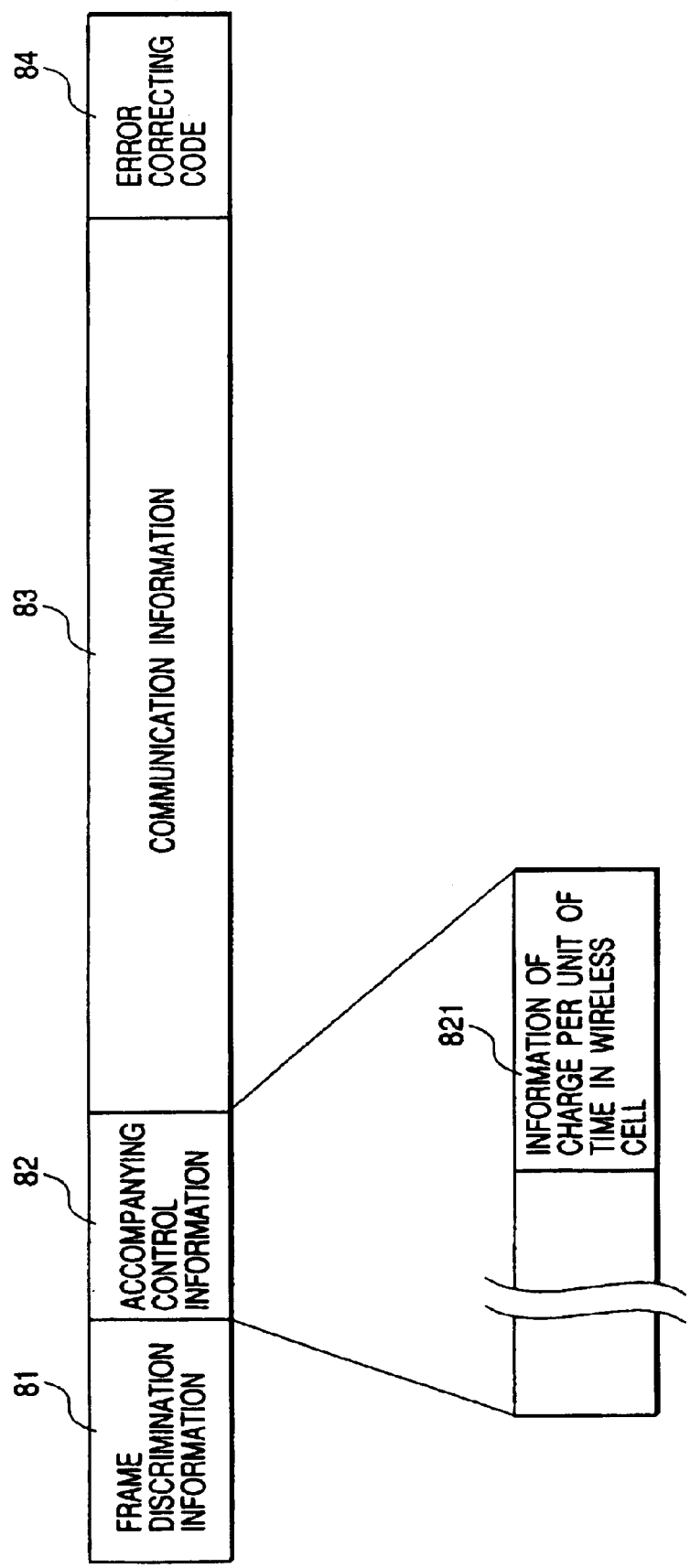
FIG. 7 is a schematic diagram showing a format of an individual communication information signal on an individual physical channel that is sent out from the wireless base station of the wireless communication system used for explaining the embodiments of the invention.
Figure 8:
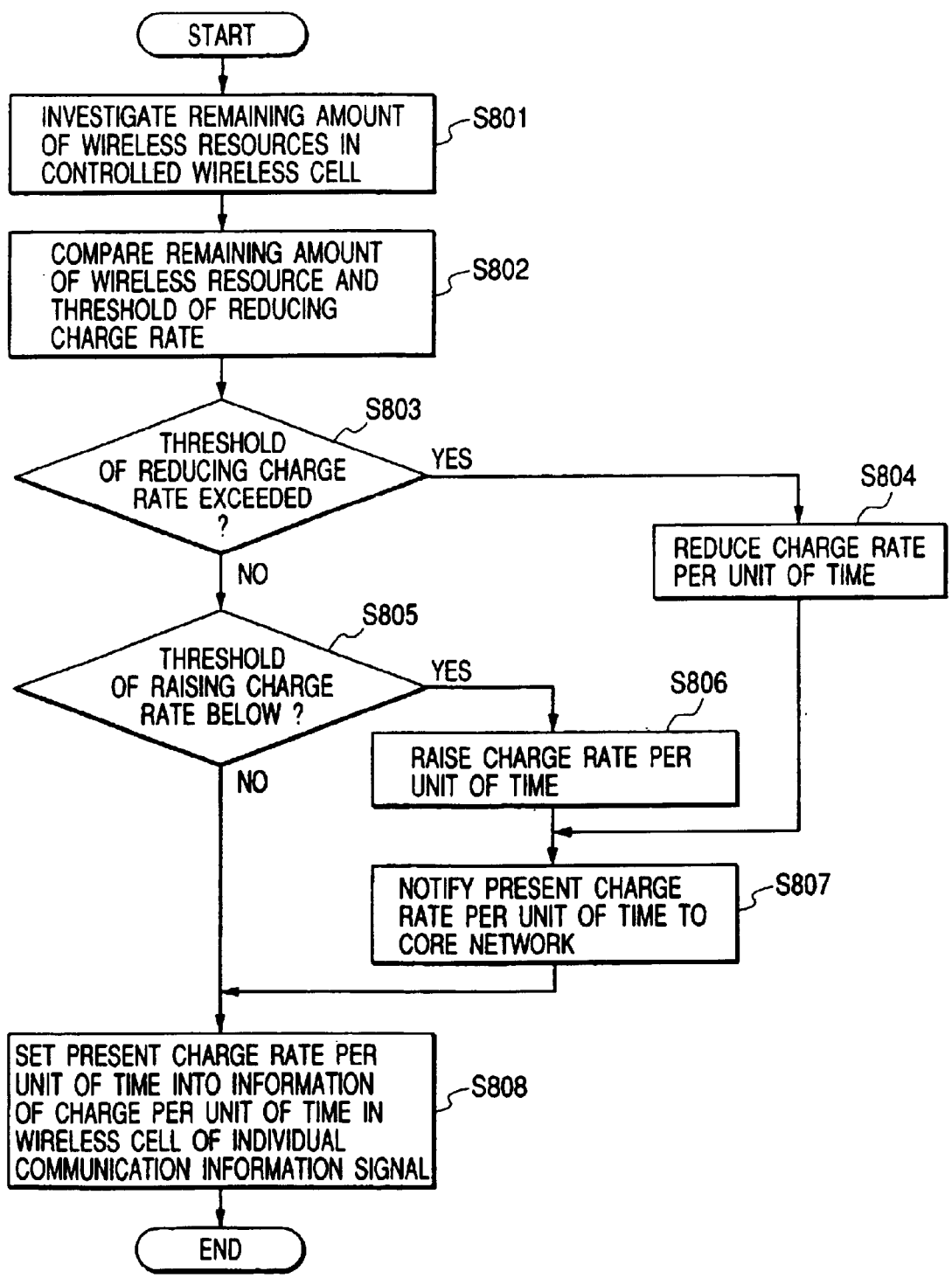
FIG. 8 is a flowchart showing a process in which the wireless base station of the wireless communication system changes the present charge rate per unit of time and sets it in an individual communication information signal according to a second embodiment of the invention.

Referring to FIGS. 5, 7 and 8, explanation will be given below of a processing in which the control unit 407 of the wireless base station 101 in the wireless communication system controls each unit to change the charge rate per unit of time in accordance with a predetermined situation in the wireless cell 100 and notify it to the wireless communication terminal 103 which is communicating according to a second embodiment of the invention. FIG. 7 is a schematic view showing a format of an individual communication information signal on the individual physical channel, which is transmitted from the wireless base station 101 of the wireless communication system according to the second embodiment of the invention.

In FIG. 7, a frame identification information field 81 indicates that the signal is an individual communication information signal, and an accompanying control information field 82 is an information transmission area for superimposing and transmitting the system control information which can be transmitted during communication (service). A communication information field 83 is for transmitting the user data (voice, data, etc.) for communication, and an error correction code 84 is for detecting and correcting an error which occurs in transmitting the signal.

In this embodiment, as a new constituent element of the accompanying control information field 82, there is provided an information field 821 of charge rate per unit of time in wireless cell which is an area for storing the charge rate information per unit of time in the wireless cell 100. Consequently, the present charge rate information per unit of time in the wireless cell 100 can be notified in real time to the wireless communication terminal 103 which is communicating in the wireless cell 100.

FIG. 8 is a flowchart showing a processing in which the wireless base station 101 of FIG. 1 changes the charge rate per unit of time and sets it within an individual communication information signal. In FIG. 8, the control unit 407 of the wireless base station 101 investigates the remaining amount of wireless resources in the controlled wireless cell 100 (step S801). Then, a comparison is made between the charge rate corresponding to the remaining amount of wireless resources in the wireless cell which is investigated by the control unit 407 and the thresholds for changing the charge rate (thresholds 71, 73 for raising the charge rate and thresholds 72, 74 for reducing the charge rate) which are stored in the RAM 405 (step S802). A determination is made whether or not the charge rate corresponding to the remaining amount of wireless resources in the wireless cell exceeds the thresholds 72, 74 of reducing the charge rate (step S803). As a result of this determination, if the charge rate corresponding to the remaining amount of wireless resources in the wireless cell does not exceed the thresholds 72, 74 of reducing the charge rate, the operation proceeds to step S805.

In step S805, a determination is made whether or not the charge rate corresponding to the remaining amount of wireless resources in the wireless cell is below the thresholds 71, 73 of raising the charge rate. As a result of determination, if it is not below the thresholds 71, 73 of raising the charge rate, the present charge rate per unit of time is set to the information field 821 of charge rate per unit of time in the wireless cell which resides within the accompanying control information field 82 of the individual communication formation signal (step S808). Then, this process ends. As a result, the charge rate is not changed, and the same charge rate is continuously used.

On the other hand, as a result of determination in step S803, if the charge rate corresponding to the remaining amount of wireless resources in the wireless cell is above the thresholds 72, 74 of reducing the charge rate, the charge rate per unit of time is reduced (step S804). The present charge rate per unit of time is notified to a core network connected to the charge control center 11 (step S807). Then a process in step S808 is performed. Thereafter, this process ends.

As a result of determination in step S805, if the charge rate corresponding to the remaining amount of wireless resources in the wireless cell is below the thresholds 71, 73 of raising the charge rate, the charge rate per unit of time is raised (step S806). Then the process in steps S807 and S808 is performed. Thereafter, this process ends.

According to the second embodiment of the invention, the wireless base stations 101, 111 change the present charge rate per unit of time information in accordance with the remaining amount of wireless resources in the wireless cells which is a dynamic information parameter (steps S801 to S806), set the thus-changed charge rate information to the information field 821 of charge rate per unit of time in wireless cell which is provided as a new constituent element within the individual communication information signal on the individual physical channel which the wireless base stations 101, 111 transmit (step S808). Thereby, the changed charge rate is notified to the wireless communication terminal 103 which is communicating within the wireless cells 100, 110, without obstructing communication of the user. Accordingly, the wireless resources in the wireless resources 100, 110 can be effectively utilized, and the user of the wireless communication terminal 103 can grasp in real time the communication fee (charge rate) during communication, to effect communication within the limit of budgetary appropriation of the user.

Also in this embodiment, the charge rate is changed based on the threshold having a hysteresis characteristic. Thereby, it is possible to suppress the charge rate from being changed too frequently during communication.

Third Embodiment

Figure 9:
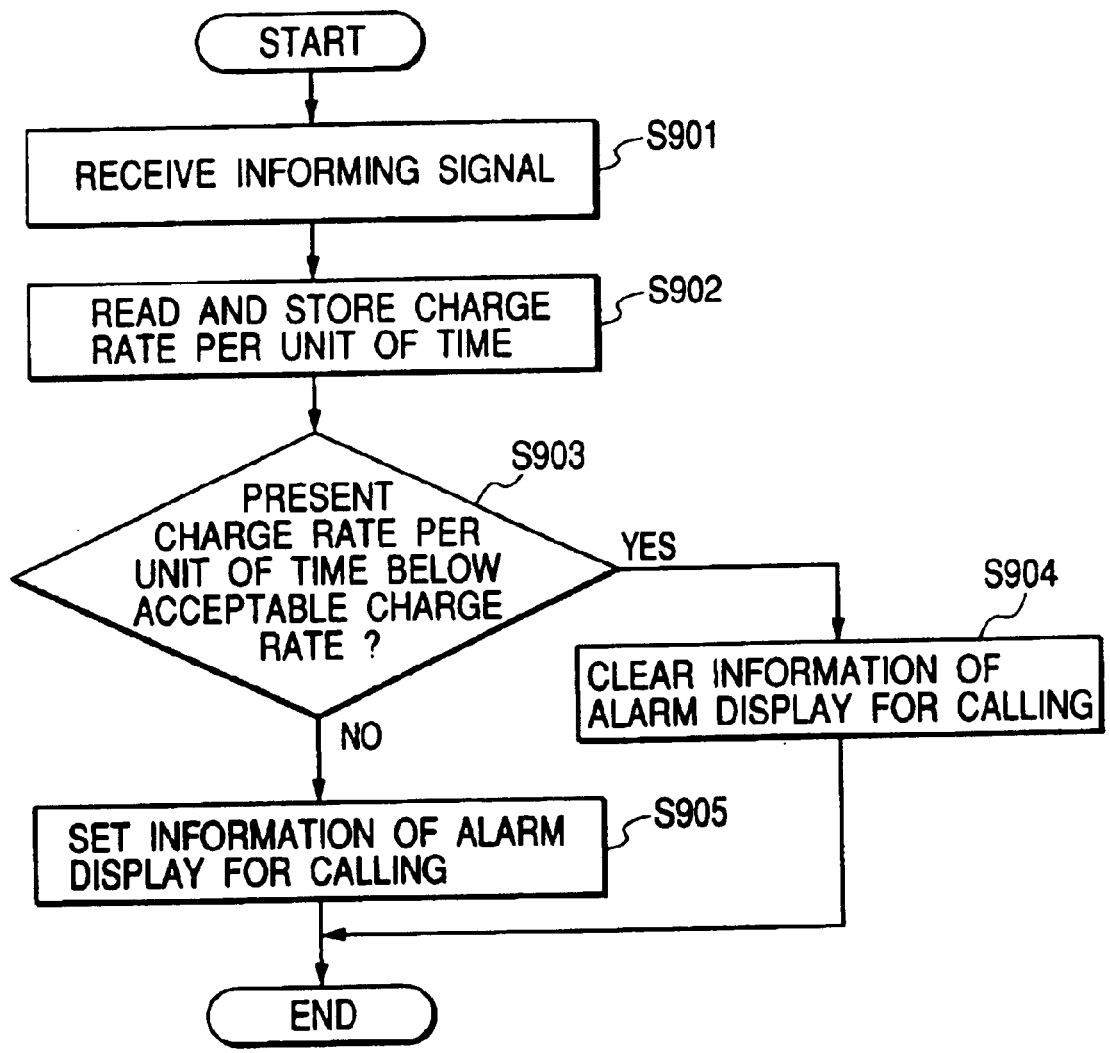
FIG. 9 is a flowchart showing a process in which the wireless communication terminal receives an informing signal while it is waiting according to a third embodiment of the invention.

Referring to FIGS. 5 and 9, explanation will be given below of a processing in which the wireless communication terminal 103 which is waiting receives an informing signal 102 in the wireless cell 100 controlled by the wireless base station 101. FIG. 9 is a flowchart showing a processing in which the wireless communication terminal 103 receives an informing signal 102 while it is waiting according to a third embodiment of the invention. A set allowable charge price 75 (allowable charge rate) which has been preset arbitrarily by the user is stored in the RAM 306 of the wireless communication terminal 103.

In FIG. 9, the wireless communication terminal 103 which is waiting in the wireless cell 100 controlled by the wireless base station 101 receives an informing signal 102 which is regularly transmitted from the wireless base station 101 (step S901). Then, the present charge rate per unit of time is read from the information field 253 of charge rate per unit of time in the wireless cell which resides in the detail of information elements field 25 for the informing signal 102 that has been received, and stored in the RAM 306 (step S902). Subsequently, a determination is made by the control unit 308 of FIG. 2 whether or not the present charge rate per unit of time stored in the RAM 306 in step S902 is equal to or less than the acceptable charge price setting 75 (acceptable charge rate) (step S903). As a result of this determination, if the charge rate is no less than the acceptable charge rate (or exceeds the acceptable charge rate setting 75), the information of alarm display for calling to effect alarm display is set up when the user makes a calling operation (step S905). Then, this process ends.

On the other hand, as a result of determination in step S903, if the present charge rate per unit of time is equal to or less than the acceptable charge rate, the information of alarm display for calling is cleared (step S904). Then, this process ends.

Figure 10:
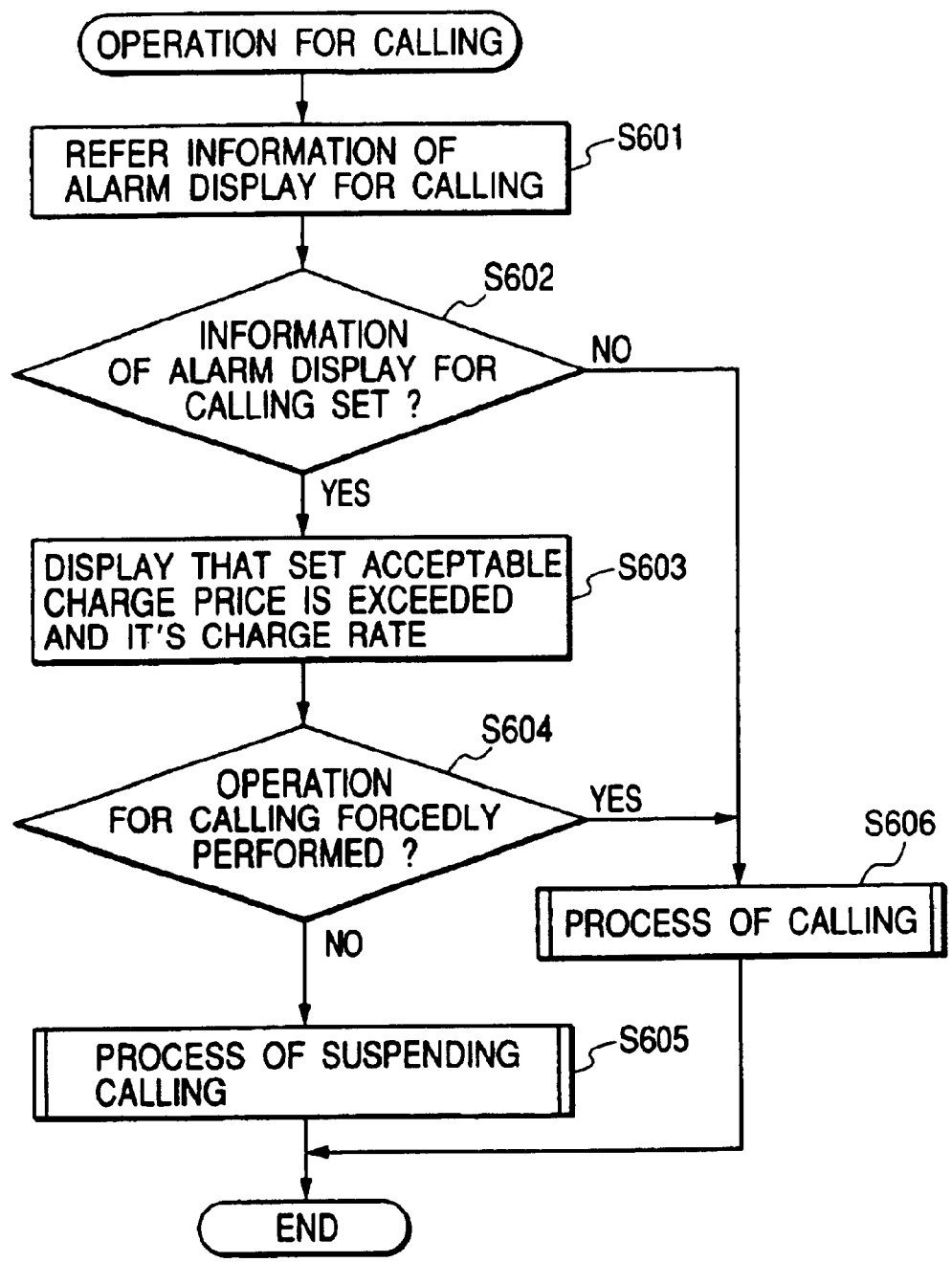
FIG. 10 is a flowchart showing a process for making a call operation by a user of the wireless communication terminal according to the third embodiment of the invention.

Referring now to FIG. 10, explanation will be given below of a processing for handling a calling operation by the user in the wireless communication terminal 103 according to the third embodiment of the invention. FIG. 10 is a flowchart showing the processing for handling a calling operation by the user in the wireless communication terminal 103 according to this embodiment of the invention. In FIG. 10, when there is a calling operation by the user, the control unit 308 of the wireless communication terminal 103 refers to an area for storing the information of alarm display for calling (step S601). Then a determination is made whether or not the information of alarm display for calling has been set up (step S602). As a result of determination, if the information of alarm display for calling has been set up, an indication that the present charge rate per unit of time exceeds the acceptable charge price setting 75 that has been preset by the user and its present charge rate per unit of time are displayed on the display unit 312 of the wireless communication terminal 103 (step S603).

Next, in step S604, a determination is made whether or not an operation for calling is forcedly performed by the user. As a result of this determination, if no operation for calling is forcedly performed for a predetermined time, a process of suspending calling is performed (step S605). Then this process ends. On the other hand, as a result of determination in step S602, if the information of alarm display for calling is not set (cleared), the operation for calling is continued (step S606). This process ends. As a result of determination in step S604, if the operation for calling is forced performed by the user, a process in step S606 is performed. Then this process ends. In step S602, even if the information of alarm display for calling is not set, the present charge rate per unit of time may be displayed.

According to the third embodiment of the invention, the wireless communication terminal 103 which is waiting in the wireless cells 100, 110 controlled by the wireless base stations 101, 111 reads and stores the present charge rate per unit of time which is notified by the informing signals 102, 112 that are sent out regularly from the wireless base stations 101, 111 (step S902), compares the present charge rate with the acceptable charge price setting 75 that has been preset by the user (step S903), sets up the information of alarm display for calling when the charge rate exceeds the acceptable charge price setting 75 (step S905), and displays an alarm for informing that the acceptable charge rate is exceeded when an operation for calling by the user is accepted (step S603). Thereby, it is possible to prevent communication from being made beyond the acceptable charge rate that has been preset by the user. By accepting an operation for calling forcedly performed by the user who has disregarded an alarm display, it is possible to handle a user's request for immediateness rather than the communication fee. When the acceptable charge rate is exceeded, the present charge rate is displayed. Therefore, based on the present charge rate displayed, a determination can be made whether or not an operation for calling should be made. Also, even if the acceptable charge rate is not exceeded, the present charge rate may be displayed, so that the user can make a call by recognizing the charge rate at all times.

Fourth Embodiment

Figure 11:
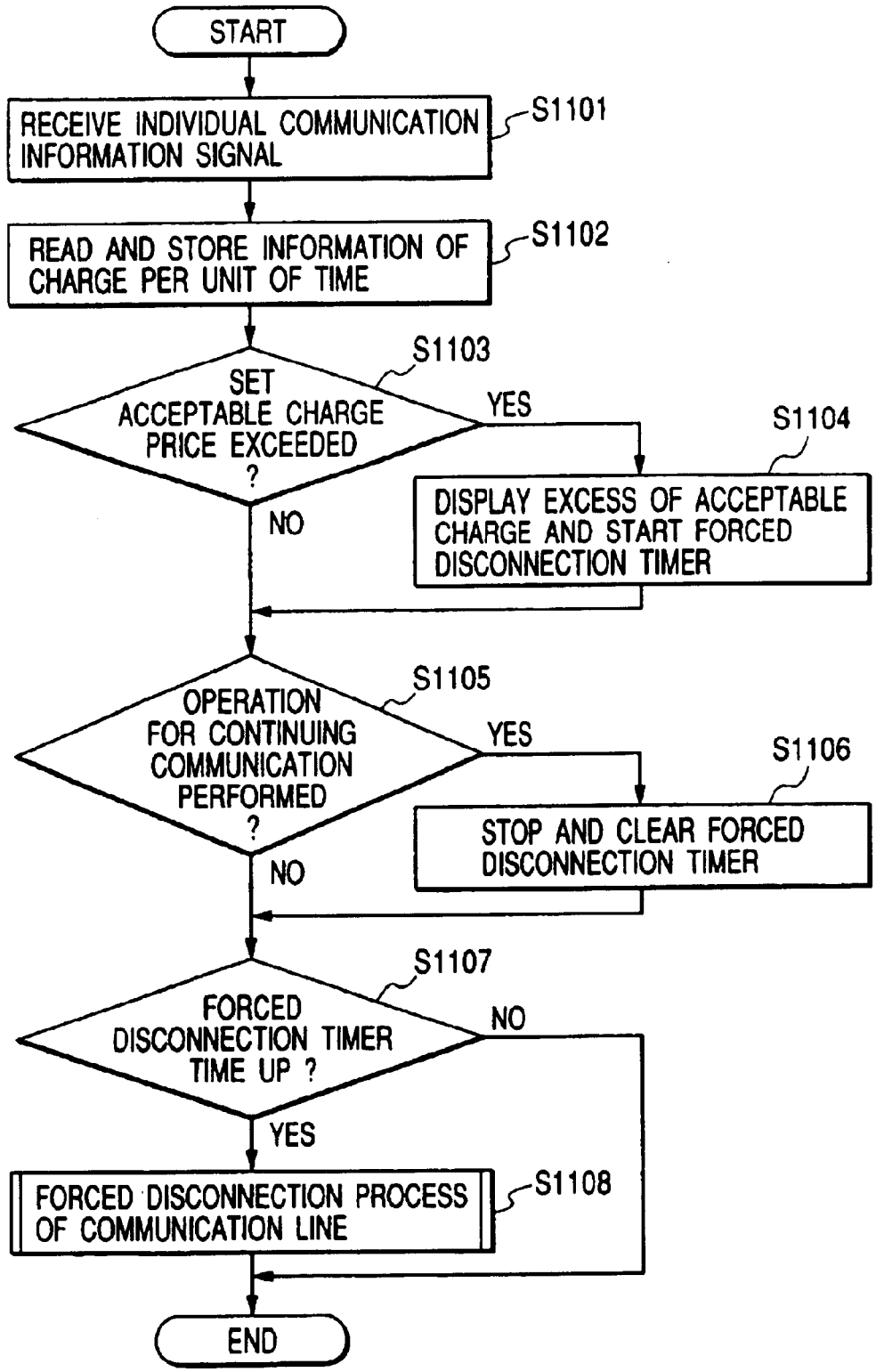
FIG. 11 is a flowchart showing a process in which the wireless communication terminal receives an individual communication information signal while it is communicating according to a fourth embodiment of the invention.

Referring now to FIG. 11, explanation will be given below of a processing in which the wireless communication terminal 103 receives an individual communication information signal on an individual communication channel during communication in the wireless cell 100 controlled by the wireless base station 101. FIG. 11 is a flowchart showing a processing in which the wireless communication terminal 103 receives an individual communication information signal during communication according to a fourth embodiment of the invention.

In FIG. 11, the wireless communication terminal 103 which is communicating in the wireless cell 100 controlled by the wireless base station 101 receives an individual communication information signal which has been sent out from the wireless base station 101 (step S1101). Then, the present charge rate per unit of time information which has been set in the information field 821 of charge rate per unit of time in the wireless cell which resides within the accompanying control information field 82 of the received individual information signal is read and stored in the RAM 306 (step S1102). Subsequently, a determination is made whether or not the present charge rate per unit of time exceeds the acceptable charge price setting 75 (acceptable charge rate) preset by the user and stored in the RAM 306 (step S1103). As a result of determination, if the charge rate does not go beyond the acceptable charge rate, a determination is made whether or not any operation for continuing communication is performed by the user (step S1105). As a result of this determination, if no operation for continuing communication is performed by the user, a determination is made whether or not a forced disconnection timer has been timed up (step S1107). As a result of this determination, if the forced disconnection timer has been timed up, a forced disconnection process of communication line is initiated to disconnect the line. Then this process ends.

On the other hand, as a result of determination in step S1103, if the acceptable charge price setting 75 is exceeded, an indication that the present charge rate per unit of time exceeds the acceptable charge rate and the present charge rate per unit of time are displayed on the display unit 312 of the wireless communication terminal 103. And the forced disconnection timer for clocking the allowable time up to the forced disconnection is started (step S1104). Then the process following the step S1105 is performed. Also, as a result of determination in the step S1105, if any operation for continuing communication is performed by the user, the forced disconnection timer that has started at the step S1104 is stopped and cleared (step S1106). The process following the step 51107 is performed. This process ends.

According to the fourth embodiment of the invention, the wireless communication terminal 103 which is communicating in the wireless cells 100, 110 controlled by the wireless base stations 101, 111 reads and stores the present charge rate per unit of time which is notified by an individual communication information signal that is sent out during communication (steps S1101, S1102), compares the present charge rate with the acceptable charge price setting 75 that has been preset by the user (step S1103), effects an alarm display for informing the user that the acceptable charge rate is exceeded, when the present charge rate exceeds the acceptable charge price setting 75 and starts the forced disconnection timer (step S1104). Further, a determination is made whether or not an operation for continuing communication is performed by the user (step S1105). Then if no operation for continuing is performed and the forced disconnection timer has been timed up, the communication line is forcedly disconnected (step S1108). Thereby, it is possible to prevent communication from continuing for the long time beyond the acceptable charge rate that has been preset by the user. By accepting an operation for continuing communication from the user who has disregarded an alarm display, it is possible to handle a user's request for the continuity of communication rather than the communication fee. When the acceptable charge rate is exceeded during communication, the present charge rate is displayed. Therefore, based on the present charge rate displayed, a determination can be made whether or not the communication should be ended.

In the fourth embodiment as described above, only if the present charge rate exceeds the acceptable charge rate, the present charge rate is displayed. However, the present charge rate may be displayed at all times. Also, when the user issues an instruction from the operation unit (not shown) during communication, the present charge rate stored in the RAM 306 in step S1102 may be read and displayed.

In this way, even if this acceptable charge rate is not exceeded during communication, the user can recognize the present charge rate.

Fifth Embodiment

A wireless communication system according to a fifth embodiment of the invention will be described below with reference to FIGS. 12 and 13.

This wireless communication system is supposed to improve a terminal gain by means of transmission diversity, and uses a mobile communication system of a wideband CDMA (W-CDMA) which is a candidate for the IMT2000 (International Mobile Telecommunication 2000) system. FIG. 12 is a systematic configuration view showing the whole of the wireless communication system according to the fifth embodiment of the invention.

Figure 12:
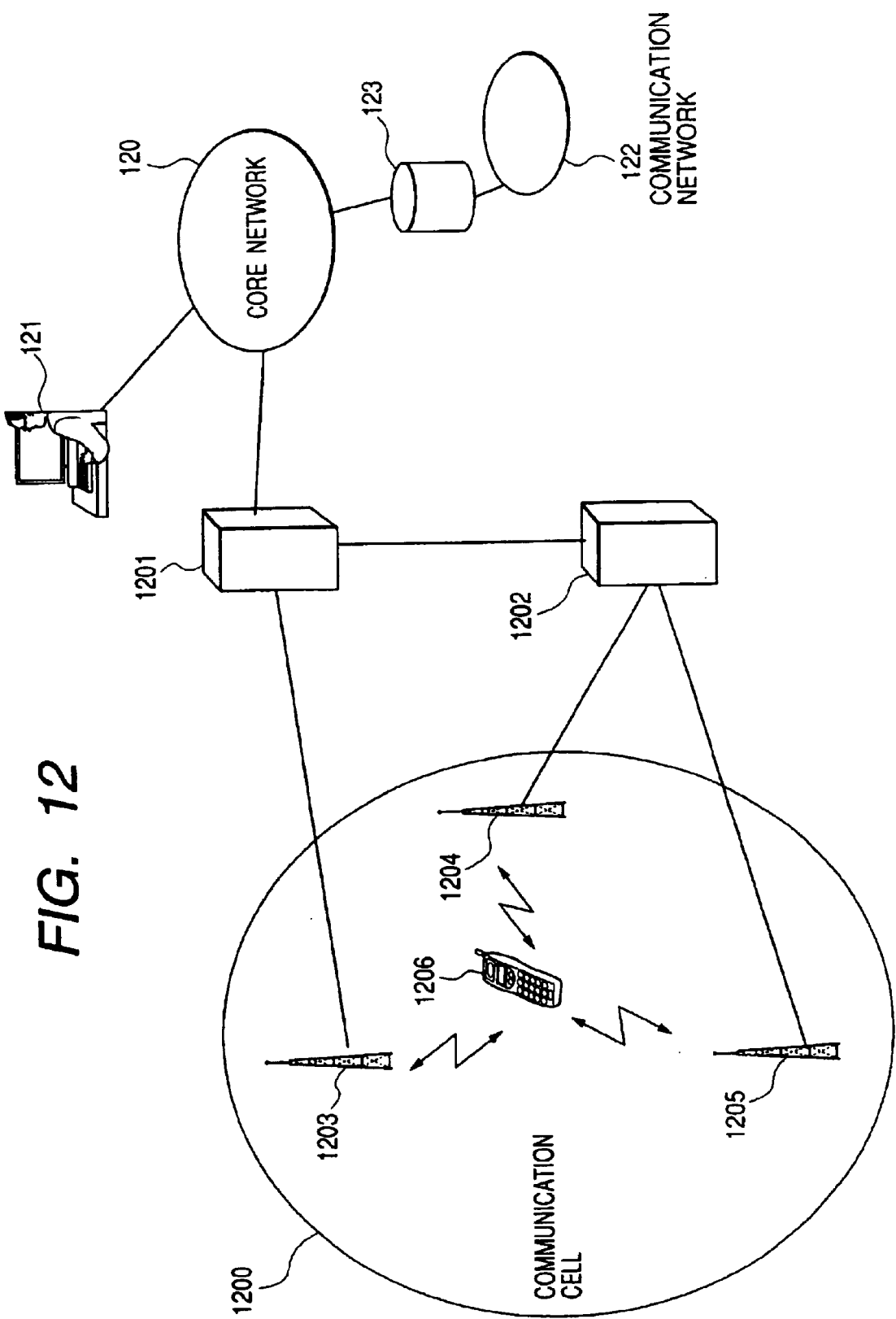
FIG. 12 is a system configuration view showing the whole of a wireless communication system according to fifth to seventh embodiments of the invention.

In FIG. 12, a communication cell 1200 controls a service wireless base station 1203 for administrating the assignment of a main wireless channel, and the drift wireless base stations 1204, 1205 for administrating the assignment of a subsidiary wireless channel. When a wireless communication terminal 1206 makes communication within the communication cell, a channel is assigned to a plurality of base stations, whereby a diversity gain can be obtained without increasing the number of antennas for the wireless communication terminal which is strongly demanded to be in small size.

The service wireless base station 1203 is connected via a service wireless network controller 1201 to a core network 120 of a communication service provider.

The drift wireless base stations 1204, 1205 are connected via a drift wireless network controller 1202 to the service wireless network controller 1201. The core network 120 is connected via a communication gateway 123 to an external communication network 122, as well as to a charge control center 121 for managing the charging of the wireless communication terminal 1206.

Regarding the relation between the service wireless base station 1203 and the service wireless network controller 1201, and the relation between the drift wireless base stations 1204, 1205 and the drift wireless network controller 1202, the wireless base station with which the wireless communication terminal 1206 has requested a wireless line connection becomes a service wireless base station 1203, and the wireless network controller for controlling the service wireless base station becomes a service wireless network controller 1201.

In this embodiment as illustrated, the service wireless base station 1203 and the drift wireless base stations 1204, 1205 are accommodated within different network controllers. However, there may be some cases where they are accommodated within the same wireless network controller, or where all the wireless base stations involved in the transmission diversity are accommodated within different wireless network controllers.

Figure 13:
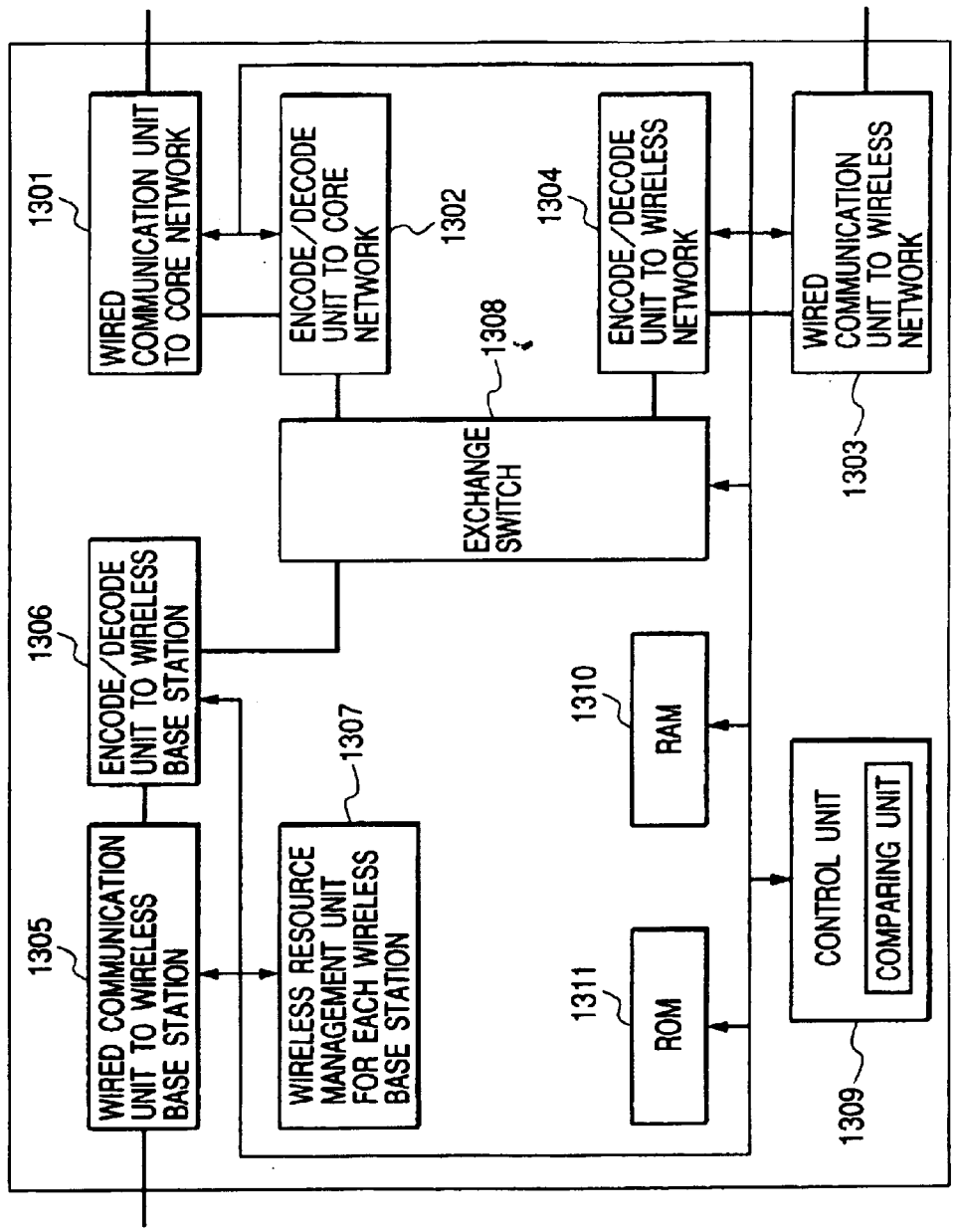
FIG. 13 is a block diagram showing an internal configuration of a wireless network controller according to the fifth to seventh embodiments of the invention.

FIG. 13 is a block diagram showing an internal configuration of the wireless network controllers 1201, 1202 of FIG. 12. In FIG. 13, a wireless network controller is configured by a wired communication unit to core network 1301 for making communication with the core network, an encode/decode unit to core network 1302 for encoding and decoding the data, which is connected to the core network wired communication unit 1301, a wired communication unit to wireless network 1303 for making communication with the other wireless network controller, an encode/decode unit to wireless network 1304 for encoding and decoding the data, which is connected to the wireless network wired communication unit 1303, a wired communication unit to wireless base station 1305 for making communication with the wireless base station, an encode/decode unit to wireless base station 1306 for encoding and decoding the data, which is connected to the wireless base station wired communication unit 1305, an exchange switch 1308 for administrating the exchange of information, which is connected to each of the data encode/decode units, a wireless resource management unit for each wireless base station 1311 for managing the information of wireless resource for each wireless base station connected thereto, a RAM 1310 for storing temporarily various kinds of information, a ROM 1311 for storing a control program, and a control unit 1309 for controlling each unit in accordance with the control program.

The wireless communication terminal is the same as shown in FIG. 2, and the wireless base station is the same as shown in FIG. 3.

An informing signal which is sent out from the wireless base stations 1203, 1204 and 1205 is in the same format as shown in FIG. 4.

Figure 14:
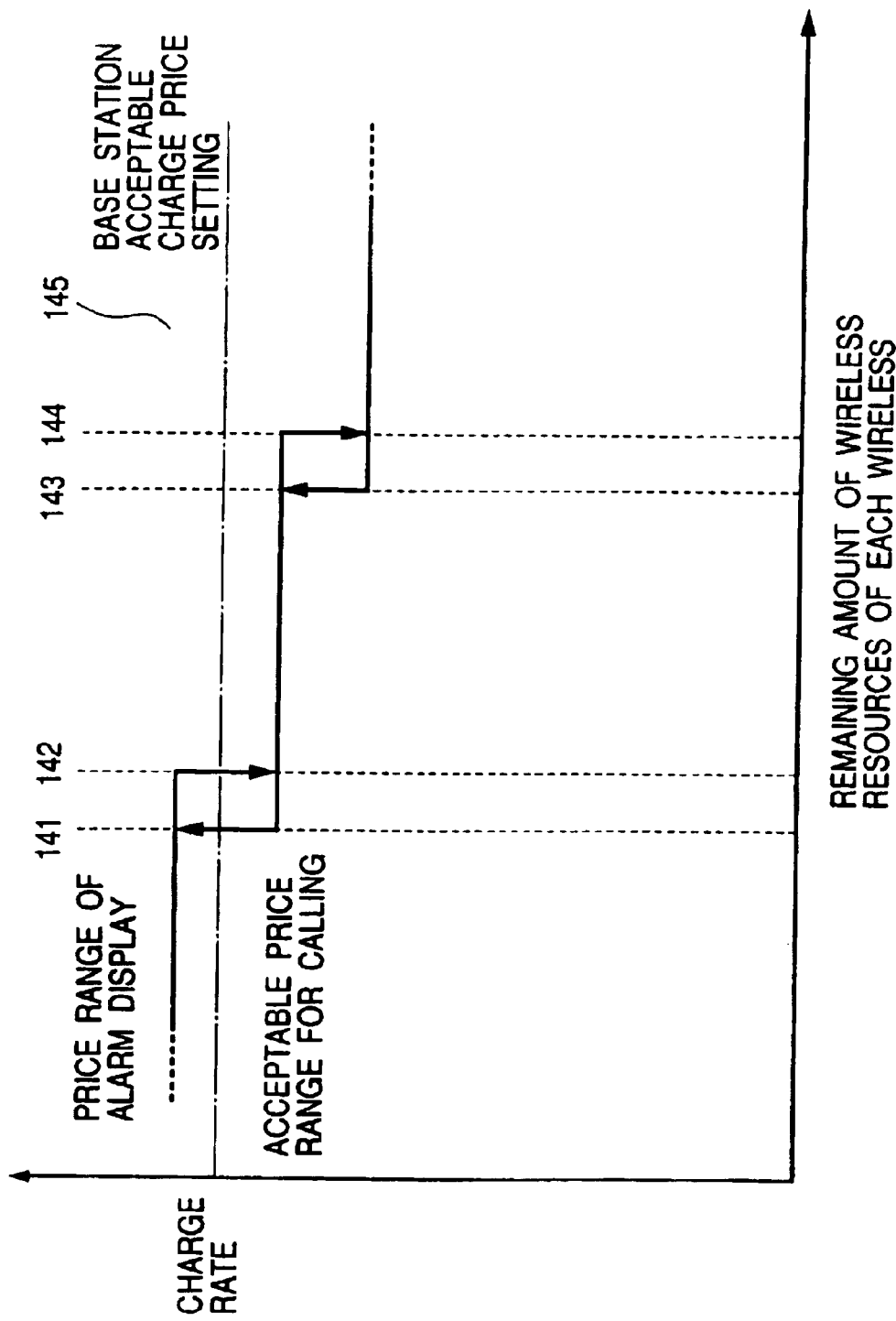
FIG. 14 is a diagram showing the relation between a charge rate per unit of time within a wireless cell and a remaining amount of wireless resources within the wireless cell which is controlled by a wireless base station of the wireless communication system used for explaining the fifth to seventh embodiments of the invention.
Figure 15:
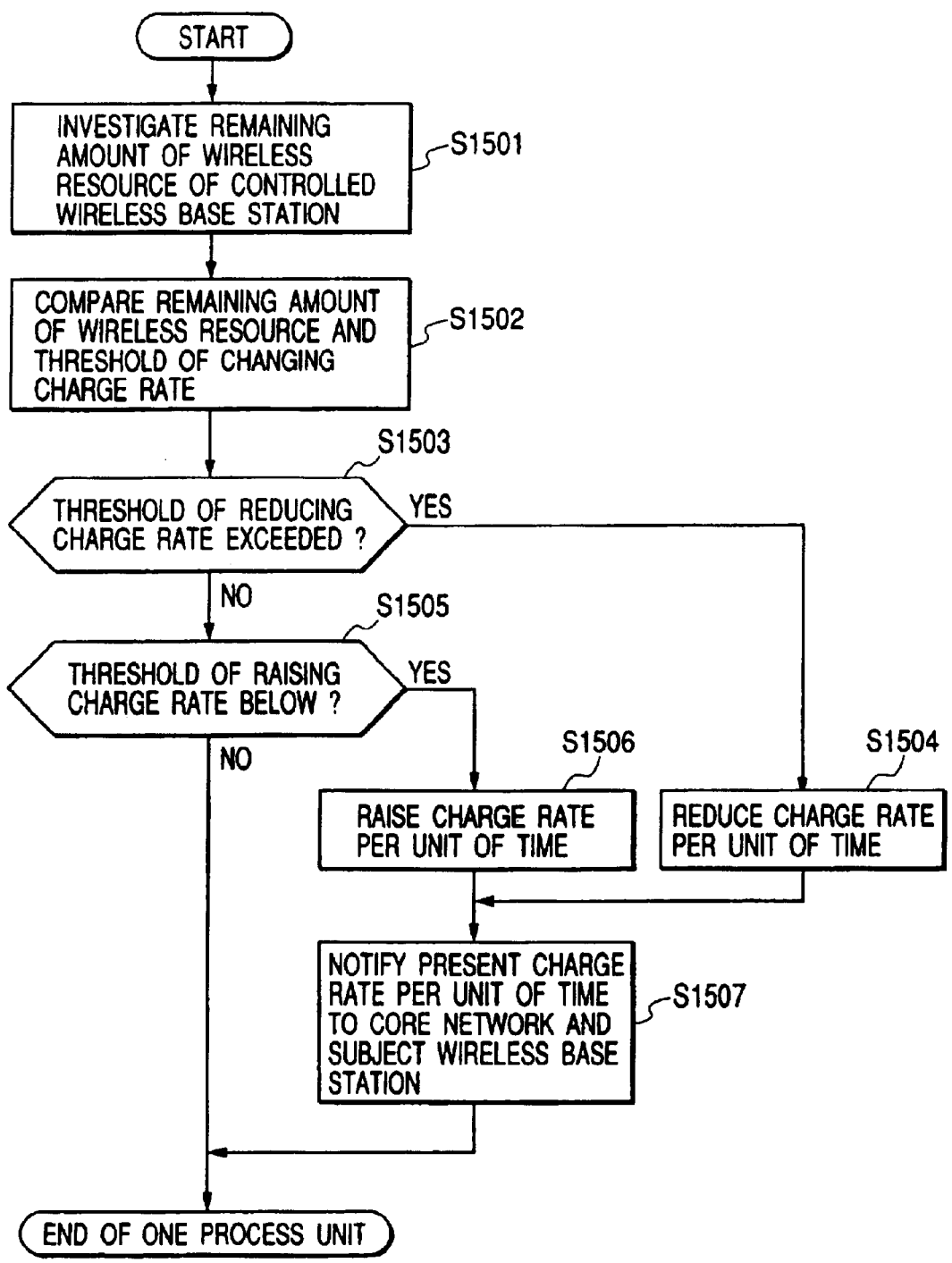
FIG. 15 is a flowchart showing a process in which the wireless network controller changes the present charge rate per unit of time and notifies the changed charge rate according to the fifth embodiment of the invention.
Figure 16:
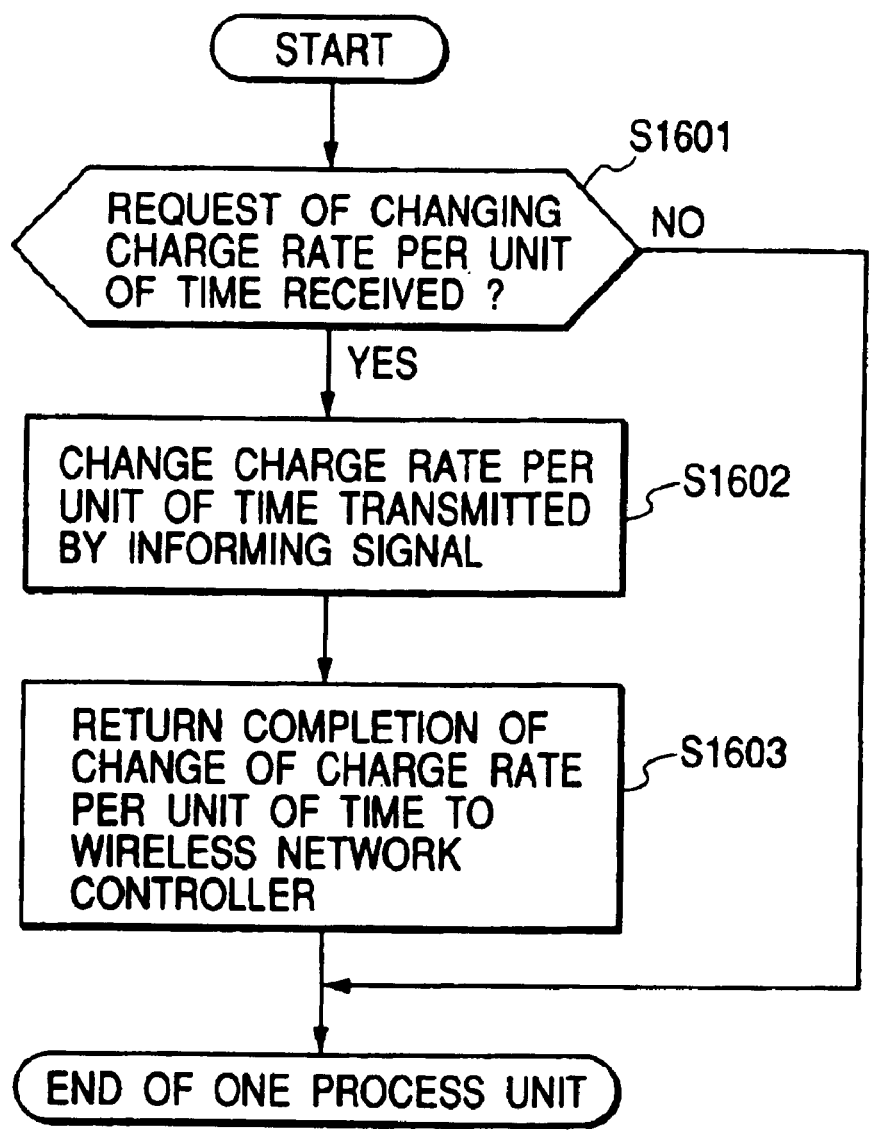
FIG. 16 a flowchart showing a process in which the wireless base station changes the charge rate according to the fifth embodiment of the invention.

Referring now to FIGS. 14 to 16, explanation will be given below of a processing in which the wireless network controllers 1201, 1202 change the charge rate per unit of time depending on the remaining amount of wireless resources available to each wireless base station controlled by the wireless network controllers 1201, 1202, and notifies the charge rate to the wireless communication terminal which is waiting. FIG. 14 is a view showing the relation between the charge rate per unit of time in each wireless base station 1203, 1204, 1205 and the remaining amount of wireless resources available to each wireless base station which is controlled by the wireless network controller according to the fifth embodiment of the invention.

In FIG. 14, the charge rate per unit of time is indicated along the axis of ordinate, and the remaining amount of wireless resources available to the wireless base station (amount of individual physical channels available) along the axis of abscissa. In this embodiment, the remaining amount of wireless resources for each wireless base station is cited as the parameter for changing the charge rate per unit of time, but the communication traffic volume for each wireless base station may be also applied.

In FIG. 14, the charge rate down thresholds 142, 144 are charge rate change thresholds for reducing the charge rate per unit of time, when the number of wireless communication terminals 1206 decreases (or the remaining amount of wireless resources for each wireless base station increases) which are connected wireless to the wireless base station. The charge rate up thresholds 141, 143 are charge rate change thresholds for raising the charge rate per unit of time, when the number of wireless communication terminals 1206 increases (or the remaining amount of wireless resources for each wireless base station decreases) which are connected wireless to the wireless base station. An acceptable charge price setting 145 is an acceptable charge rate that can be preset by the user. A price range of alarm display indicates a range of charge rate going beyond the acceptable charge price setting 145, and an acceptable price range for calling indicates a range of charge rate falling below the acceptable charge price setting 145. Also in this embodiment, the charge rate is changed in accordance with the charge rate change threshold having a hysteresis characteristic.

FIG. 15 is a flowchart showing a processing in which the wireless network controllers 1201, 1202 in the wireless communication system change the present charge rate per unit of time and notifies it to the core network 120, and the wireless base stations 1203, 1204, and 1205 according to the fifth embodiment of the invention. In FIG. 15, a control unit 1309 of the wireless network controller investigates the remaining amount of wireless resources in each controlled wireless base station (step S1501). Then, a comparison is made between the remaining amount of wireless resources in each wireless base station which is investigated and stored by the wireless resource management unit for each wireless base station 1307 of FIG. 13 and the thresholds of changing the charge rate which are stored in the RAM 1310 (step S1502). A determination is made whether or not the remaining amount of wireless resources in each wireless base station exceeds the thresholds 142, 144 of reducing the charge rate (step S1503). As a result of this determination, if the remaining amount of wireless resources in each wireless cell does not exceed the thresholds 142, 144 of reducing the charge rate, the operation proceeds to a next step (step S1505).

Next, a determination is made whether or not the remaining amount of wireless resources in each wireless base station is below the thresholds 141, 143 of raising the charge rate (step S1505). As a result of determination, if it is not below the thresholds 141, 143 of raising the charge rate, this process ends. As a result, the charge rate is not changed. In each wireless base station, the same charge rate is continuously used.

On the other hand, as a result of determination in step S1503, if the remaining amount of wireless resources in a wireless base station is above the thresholds 142, 144 of reducing the charge rate, the charge rate per unit of time in that wireless base station is reduced (step S1504). The present charge rate per unit of time is notified to the core network 120, the charge control center 121 and the wireless base station (step S1507). Then this process ends.

As a result of determination in step S1505, if the remaining amount of wireless resources in a wireless base station is below the thresholds 142, 144 for increasing the charge rate, the charge rate per unit of time in that wireless base station is reduced (step S1506). The present charge rate per unit of time is notified to the core network 120, the charge control center 121 and the wireless base station (step S1507). Then this process ends.

FIG. 16 is a flowchart showing a process for changing the charge rate per unit of time within an information element of an informing signal which is transmitted regularly by the wireless base stations 1203, 1204 and 1205 of the wireless communication system according to the fifth embodiment of the invention. A determination is made whether or not there is a request of changing the charge rate per unit of time transmitted by the wireless network controllers 1201, 1202 (step S1601). If there is no request, this processing is directly ended. As a result, the charge rate per unit of time on the informing signal is not changed, and the transmission of the informing signal is continued at the same charge rate.

On the other hand, if there is a request, the charge rate per unit of time that is transmitted by the informing signal is changed in accordance with the request (step S1602). A completion of change of the charge rate per unit of time is notified to the wireless network controller (step S1603). Thereafter, this process ends. As a result, the charge rate per unit of time set up by the wireless network controller can be reflected to the charge rate information per unit of time on the informing signal in the wireless base station.

According to the fifth embodiment of the invention, the changed charge rate is notified to the wireless communication terminal which is waiting, without effecting wireless line connection. Accordingly, the wireless resources in each wireless base station can be effectively utilized, and the user of the wireless communication terminal can grasp the communication fee (charge rate) before making line connection, to effect communication within the limit of budgetary appropriation of the user.

Also, the charge rate is changed based on the thresholds having a hysteresis characteristic. Thereby, it is possible to suppress the charge rate from being changed too frequently.

Sixth Embodiment

Referring now to FIGS. 17 to 20, explanation will be given below of a processing in which the wireless communication terminal 1206 makes a call connection in the wireless communication system (as shown in FIG. 12) according to a sixth embodiment of the invention.

Figure 17:
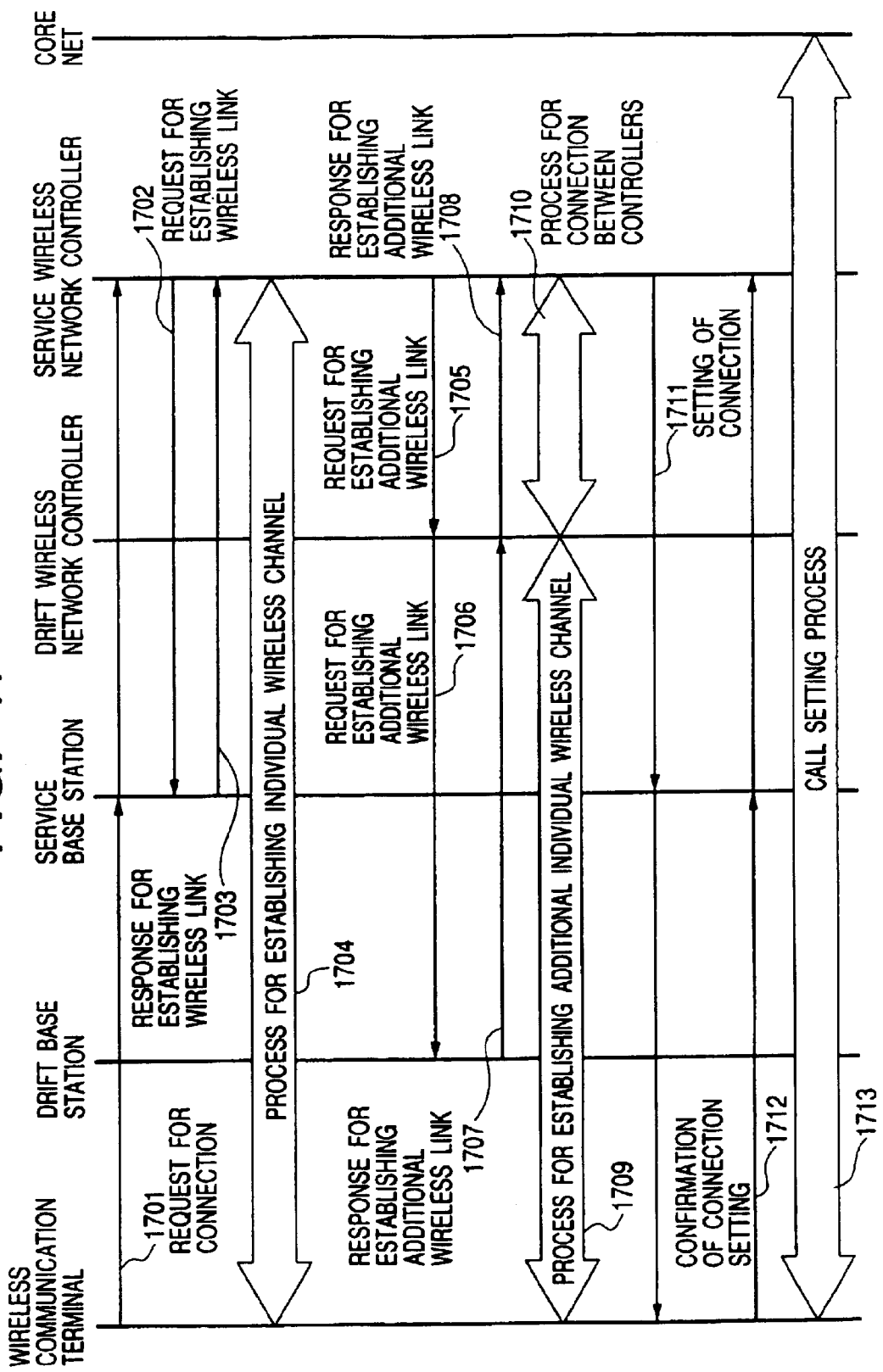
FIG. 17 is a conceptual diagram of control sequence in which a wireless communication terminal makes a call connection by establishing a wireless link with a plurality of wireless base stations according to the sixth embodiment of the invention.
Figure 18:
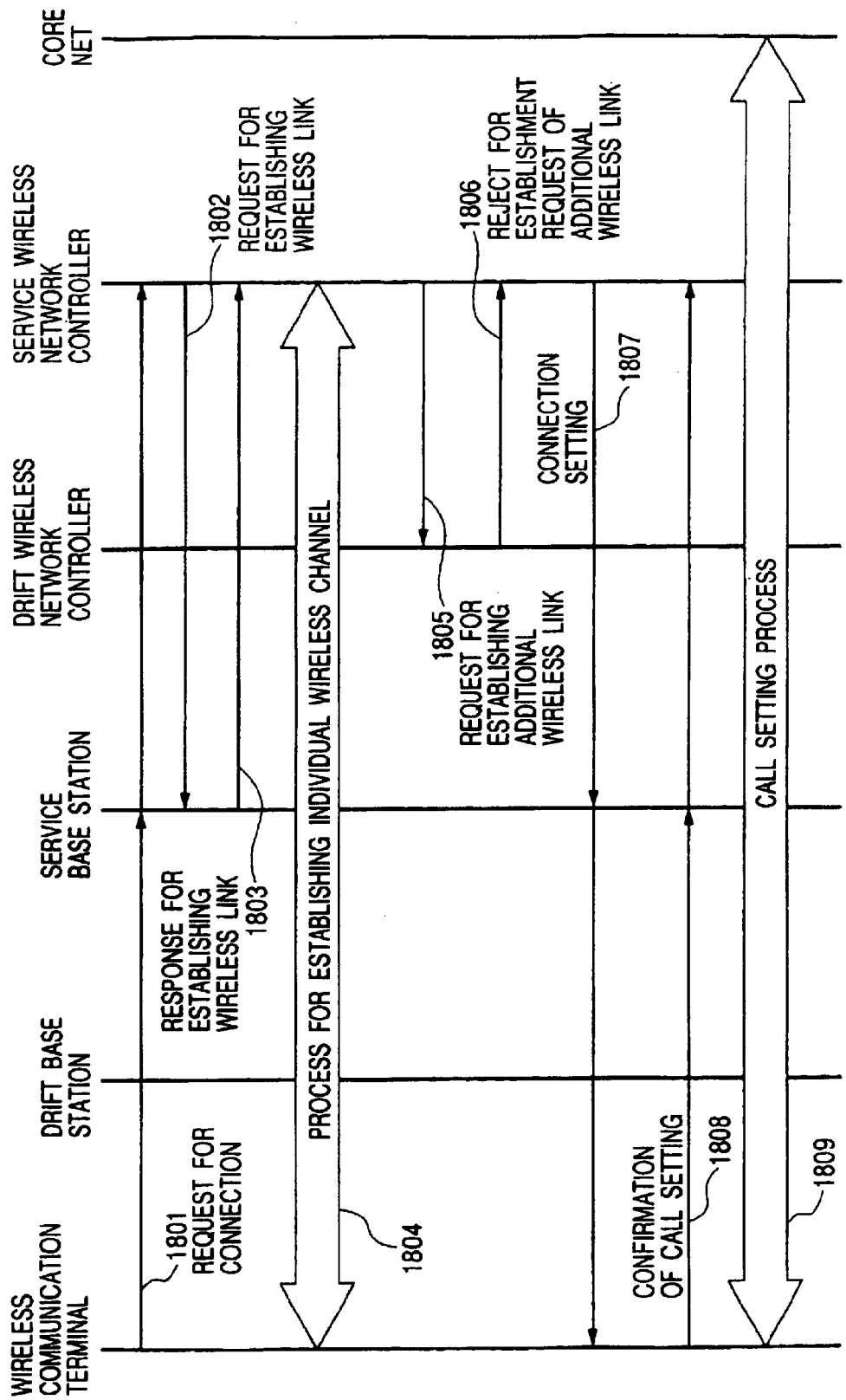
FIG. 18 is a conceptual diagram of control sequence in which a wireless communication terminal makes a call connection by establishing a wireless link only with a service wireless base station according to the sixth embodiment of the invention.
Figure 19:
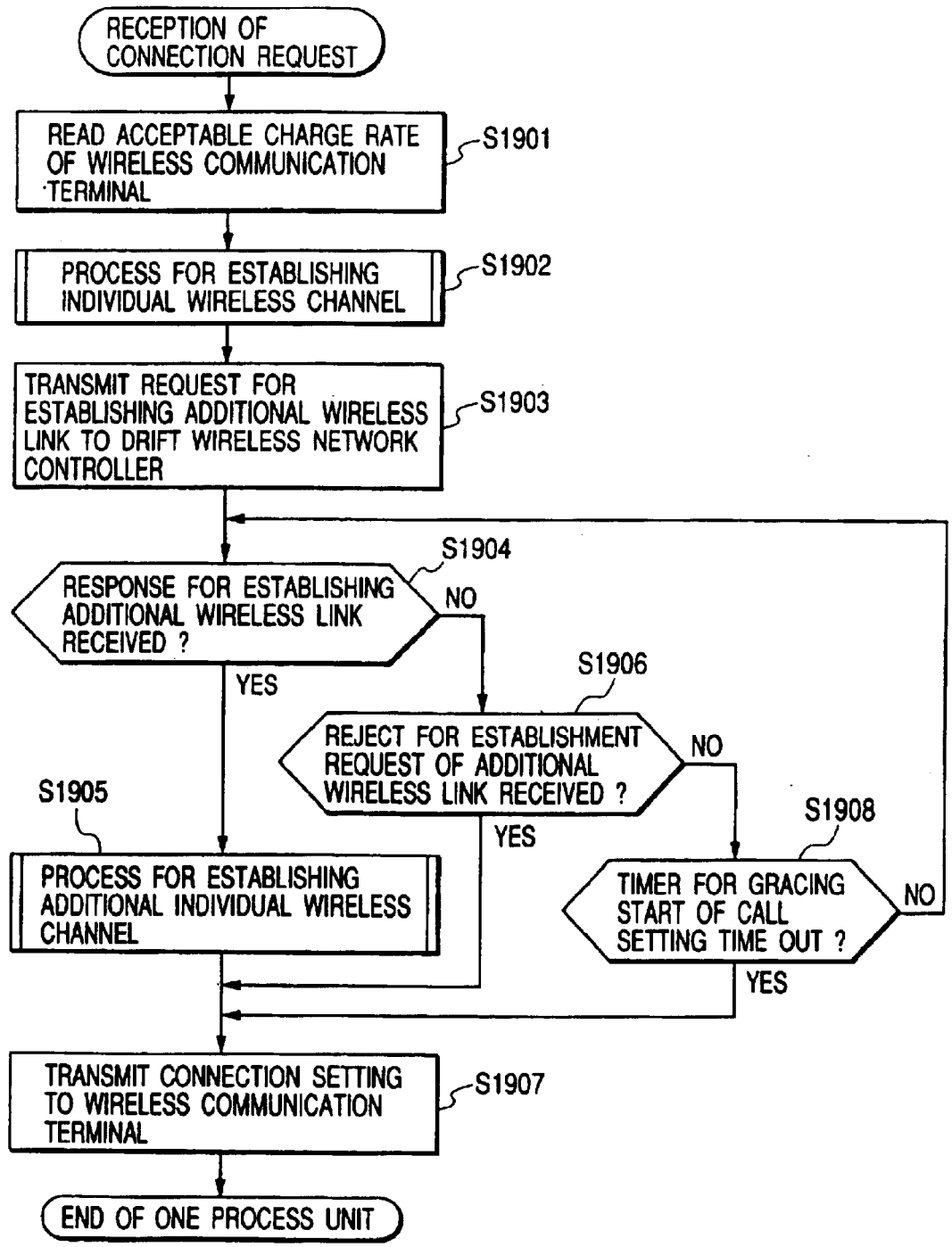
FIG. 19 is a flowchart showing a process for a service wireless network controller according to the sixth embodiment of the invention.
Figure 20:
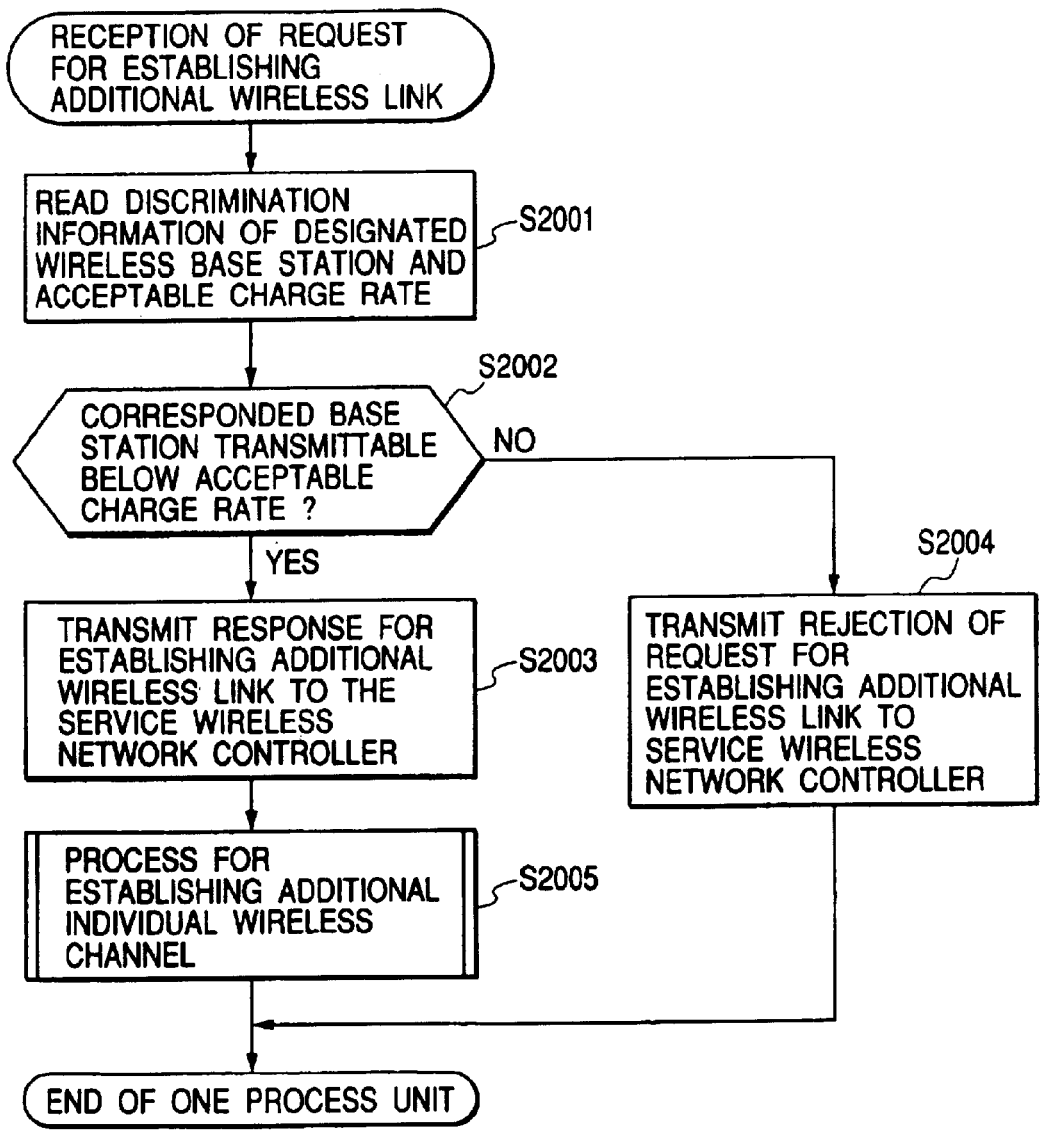
FIG. 20 is a flowchart showing a process for a drift wireless network controller according to the sixth embodiment of the invention.

FIG. 17 is a control sequence conceptual diagram in which the wireless communication terminal makes a call connection with a plurality of wireless base stations by setting up the wireless line. FIG. 18 is a control sequence conceptual diagram in which the wireless communication terminal tried to make a call connection with a plurality of wireless base stations by setting up the wireless line, but makes a call connection only with the service wireless base station by setting up the wireless line because no agreement has not been reached in respect of the acceptable charge price with the drift wireless base stations that are communicable. FIG. 19 is a control concept flowchart of the service wireless network controller 1201 in this embodiment. FIG. 20 is a control concept flowchart of the drift wireless network controller 1202 in this embodiment.

A wireless communication terminal 1206, which has accepted a notification of incoming call to the wireless communication terminal or an operation for calling by the user, transmits a connection request message (1701, 1801) for call connection to the wireless base station (hereinafter referred to as a service wireless base station) which judges that the wireless connection is possible at its own acceptable charge rate in the processing of the fifth embodiment.

As the information parameter of this connection request message, the set acceptable charge price of the wireless communication terminal is notified.

The service wireless base station which has received the connection request message transfers a connection request message to the wireless network controller. The wireless network controller (hereinafter referred to as a service wireless network controller) which has received the connection request message via the service wireless base station reads the set acceptable charge price of the wireless communication terminal from this received message (step S1901), and initiates a process (steps S1702 to S1704, S1802 to S1804) of establishing the individual wireless channel (step S1902). After completion of the process of establishing the individual wireless channel, the service wireless network controller transmits an additional wireless link establishment request message to make a request for establishing an additional individual wireless channel to the wireless network controller (hereinafter referred to as a drift wireless network controller) which controls the wireless base station (hereinafter referred to as a drift wireless base station) which exists in close vicinity to the service wireless base station and at the position where the wireless link with the wireless communication station can be established (steps S1705, S1805, S1903).

As the information parameters for this additional wireless link establishment request message, the set acceptable charge price of the wireless communication terminal and the identification information of the wireless base station to be designated as the drift wireless base station are notified.

The drift wireless network controller which has accepted an additional wireless link establishment request message reads the identification information of the wireless base station designated as the drift wireless base station and the acceptable charge price of the wireless communication terminal for effecting communication this time (step S2001). A comparison is made between the present charge rate of the designated drift-wireless base station and the acceptable charge price of the wireless communication terminal (step S2002). If the present charge rate is equal to or less than the acceptable charge price of the wireless communication terminal, an additional wireless link establishment response message (1708) is returned to the service wireless network controller (step S2003). And a process of establishing the additional individual wireless channel (1706 to 1709) is performed (step S2005).

If the present charge rate of a wireless base station designated as drift wireless base station exceeds the acceptable charge price of the wireless communication terminal, an additional wireless link establishment request reject message (1806) is returned to the service wireless network controller (step S2004).

If the service wireless network controller receives the additional wireless link establishment response message (1708) in step S1904, a process of establishing the additional individual wireless channel (1706 to 1710) is performed (step S1905). Thereafter, a connection setting message (1711) is transmitted to the wireless communication terminal. After confirming the reception of a connection setting confirmation message (1712) as a response from the wireless communication terminal, a call setting process (1713) is performed. The call connection is made in a state where the wireless link is established with the plurality of wireless base stations (step S1907).

Also, in the case where the additional wireless network request reject message (1806) is received (step S1906), or a timer for gracing the start of call setting has timed out without response from the drift wireless network controller (step S1908), a connection setting message (1807) is transmitted to the wireless communication terminal. After confirming the reception of a connection setting confirmation message (1808) as a response from the wireless communication terminal, a call setting process (1809) is performed. The call connection is made in a state where the wireless link is established with a single wireless base station (service base station) (step S1907).

According to the sixth embodiment of the invention, it is possible to effect communication (wireless line connection) having communication quality (with or without transmission diversity) within the limit of budgetary appropriation of the user in making a call connection.

In this embodiment, the service wireless network controller and the drift wireless network controller are physically independent. However, in the case where the drift wireless base station is accommodated within the service wireless network controller, the process of the service wireless network controller and the process of the drift wireless network controller are performed within a single wireless network controller. Consequently, the same effects can be provided as shown in this embodiment.

Seventh Embodiment

Referring now to FIGS. 7, 14, 21 and 22, explanation will be given below of a processing in which the service wireless network controller 1201 changes the charge rate in accordance with the remaining amount of wireless resources for the wireless base station to be used for communication and notifies it to the wireless communication terminal 1206 which is communicating in the wireless communication system according to a seventh embodiment of the invention.

Figure 21:
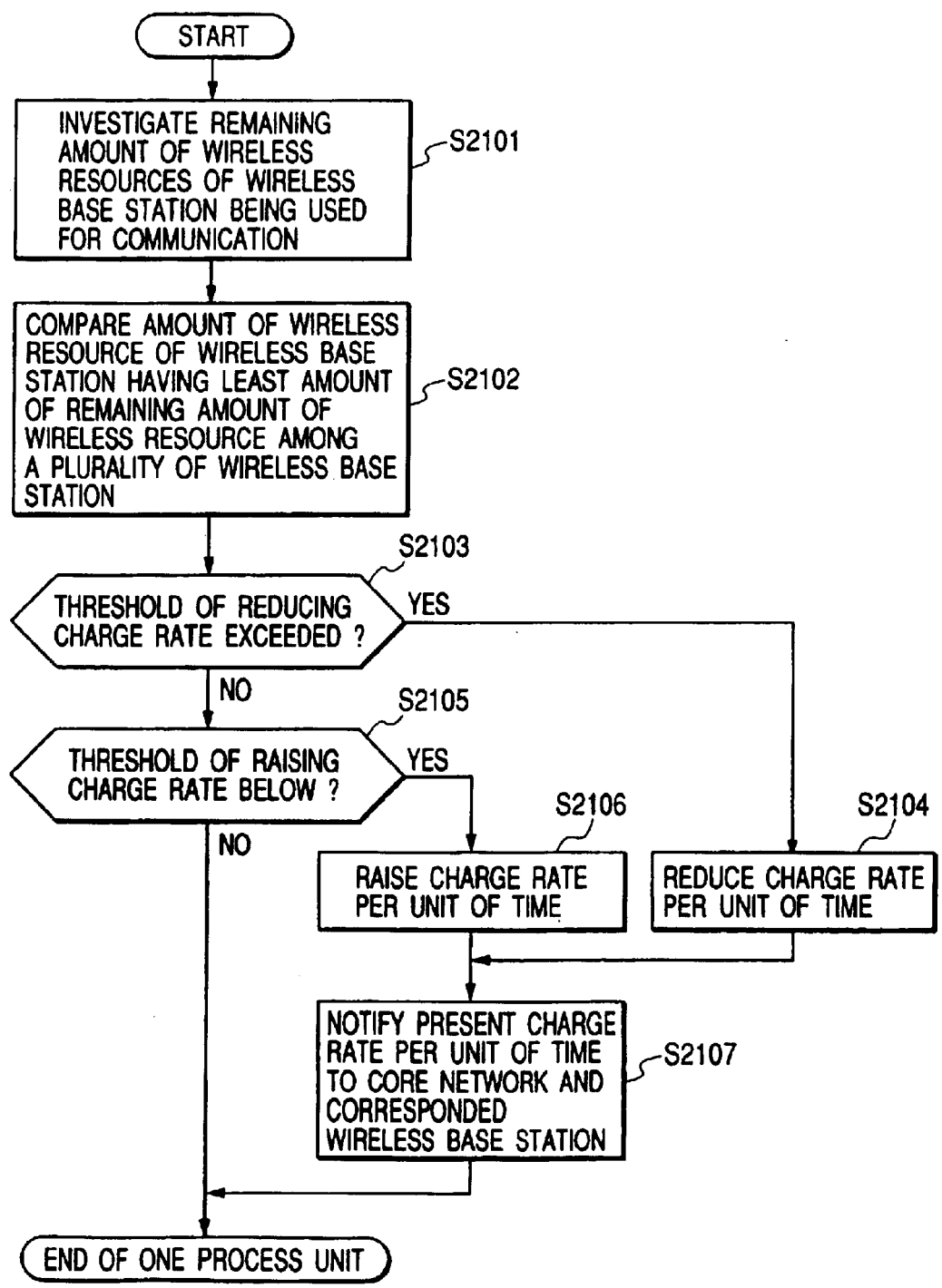
FIG. 21 is a flowchart showing a process for a service wireless network controller according to a seventh embodiment of the invention.

FIG. 21 is a flowchart showing a processing in which the service wireless network controller 1201 changes the charge rate per unit of time and make a notification of the charge rate to the core network 120 and the wireless base stations 1203 to 1205. FIG. 22 is a flowchart showing a processing in which the wireless base stations set the charge rate to the accompanying control area of the individual communication information signal in accordance with the notification.

In FIG. 21, the service wireless network controller investigates the remaining amount of wireless resources in each controlled wireless base station (step S2101). Then a comparison is made between the remaining amount of wireless resources in a wireless base station with the smallest remaining amount among the remaining amounts of wireless resources for the wireless base stations (including the remaining amount of wireless resources for the drift wireless base station) which are investigated and stored by the wireless resource management unit 1307 for each wireless base station of FIG. 13 and the change thresholds of the charge rate (step S2102). A determination is made whether or not the smallest remaining amount of wireless resources in the wireless base stations exceeds the thresholds 142, 144 for reducing the charge rate (step S2103). As a result of this determination, if the remaining amounts of wireless resources for the wireless base stations do not go beyond the thresholds 142, 144 for reducing the charge rate, the operation proceeds to the next step S2105.

Next, a determination is made whether or not the remaining amount of wireless resources in the wireless base stations is below the thresholds 141, 143 for raising the charge rate (step S2105). As a result, if it does not fall below the thresholds 141, 143 for raising the charge rate, this process ends. Consequently, the charge rate is not changed, and the same charge rate is continuously used.

On the other hand, as a result of comparison in step S2103, if the remaining amount of wireless resources in the wireless base stations exceeds the thresholds 142, 144 for reducing the charge rate, the charge rate per unit of time is reduced (step S2104). And the present charge rate per unit of time is notified to the core network 120, the charge control center 121 and the wireless base station of interest (step S2107). Then this process ends.

As a result of comparison in step S2205, if the remaining amount of wireless resources in the wireless base stations goes below the thresholds 141, 142 for increasing the charge rate, the charge rate per unit of time is increased (step S2106). And the present charge rate per unit of time is notified to the core network 120, the charge control center 121 and the wireless base station of interest (step S2107). Then this process ends.

FIG. 22 is a flowchart showing a process for changing the charge rate per unit of time within the accompanying control signal information element which is transmitted by the wireless base stations 1203, 1204 and 1205 in the wireless communication system according to the seventh embodiment of the invention. First, a determination is made whether or not there is a request of changing the charge rate transferred from the service wireless network controller 1201 (step S2201). If there is no request, this process ends. As a result, the charge rate per unit of time on the accompanying control signal is not changed, and the transmission of accompanying control signal is continued at the same charge rate.

On the other hand, if there is a request, the charge rate per unit of time transmitted by the accompanying control signal is changed in accordance with the request (step S2202). Then the completion of change is notified to the service wireless network controller (step S2203). Thereafter, this process ends. As a result, the charge rate per unit of time which has been set by the service wireless network controller can be reflected onto the charge rate information per unit of time on the individual communication information signal of the wireless base station.

According to the seventh embodiment of the invention, the changed charge rate is notified to the wireless communication terminal which is communicating without interrupting the communication. Thereby, it is possible to make effective use of the wireless resources for each wireless base station. Further the user of the wireless communication terminal can grasp the communication fee (charge rate) in real time before the line connection and effect communication within the limit of budgetary appropriation of the user.

In the above-described fifth to seventh embodiments of the invention, the wireless network controller determines the charge rate of the controlled wireless base station. However, each wireless base station may determine the charge rate. In this case, the wireless base station may notify the determined charge rate to the wireless network controller, and the wireless network controller may manage the charge rate notified from each wireless base station. Thereby the same processing as above can be performed.

Other Embodiments

In the above-described embodiments, a wideband CDMA (W-CDMA) mobile communication system which is a wireless communication system based on the micro cell, and a candidate for the IMT 2000 (International Mobile Telecommunication 2000) system has been described. The present invention is also applicable to other wireless communication terminals operating under the wireless communication systems (e.g., a narrow band CMDA mobile communication system PHS, PDC, GSM, etc.) based on the micro cell.

As described above, with this invention, since the charge rate is changed with reference to the thresholds having a hysteresis characteristic, it is possible to suppress the variation of the charge rate.

For a wireless communication unit which is waiting, the charge rate can be notified without using a special signal or procedure for notification of the charge rate, because the charge rate can be notified to the wireless communication unit using an informing signal.

Also for a wireless communication unit which is communicating, the charge rate can be notified without interrupting the communication and using any special signal and procedure, because the charge rate can be notified using a communication information signal that is transmitted from the wireless control device to the wireless communication unit.

A wireless communication unit can be connected to the wireless control device in accordance with a charge rate notified by the wireless communication unit.

Also in a system in which the charge rate is changed dynamically, it is possible to provide a wireless communication unit which is easy to use.

What is claimed is:

1. A wireless communication system having a plurality of wireless controllers for controlling a mobile apparatus, comprising:

an identification device adapted to identify a charge rate for communication within each wireless cell controlled by the wireless controller;

a connection device adapted to connect a first wireless controller and the mobile apparatus in accordance with a request from the mobile apparatus;

a receiving device adapted to receive charge rate information transmitted from the mobile apparatus;

a decision device adapted to decide a second wireless controller to be connected to said mobile apparatus based on the charge rate information received by said receiving device and the charge rate identified by said identification device; and a control device adapted to control to connect the second wireless controller decided by said decision device and the mobile apparatus, wherein the mobile apparatus connects and communicates with the first wireless controller and second wireless controller.

2. The wireless communication system according to claim 1, wherein said identification device identifies the charge rate based on a situation within said wireless cell.

3. A method for controlling a plurality of wireless controllers for controlling mobile apparatus, comprising:

a identification step of identifying the charge rate for communication within each wireless cell of the plurality of wireless controllers;

a receiving step of receiving charge rate information received by the mobile apparatus;

a decision step of deciding a wireless controller to be connected to the mobile apparatus based on the charge rate information received in by said receiving step and the charge rate identified in said identification step; and a connection step of connecting the mobile apparatus with the wireless controller requested to connect by the mobile apparatus and the wireless controller decided in said decision step.

4. A wireless communication system according to claim 1, wherein said decision device decides the wireless controller with the charge rate that is less expensive than the charge rate information from the mobile apparatus.

5. A wireless communication system according to claim 1, wherein said decision device does not decide the second wireless controller when the wireless controller with the charge rate that is less expensive than the charge rate information from the mobile apparatus does not exist.

* * * * *

UNITED STATES PATENT AND TRADEMARK OFFICE
CERTIFICATE OF CORRECTION

| | |
|---|---|
| PATENT NO. | : 6,934,527 B1 |
| APPLICATION NO. | : 09/676685 |
| DATED | : August 23, 2005 |
| INVENTOR(S) | : Hamada |

It is certified that error appears in the above-identified patent and that said Letters Patent is hereby corrected as shown below:

Column 11, line 21, change "51107" to read -- S1107 --

Claim 3, column 20, line 5 change "in by said" to read -- in said --

Signed and Sealed this

Twenty-ninth Day of May, 2007

JON W. DUDAS
*Director of the United States Patent and Trademark Office*